United States Patent
Paulson

(10) Patent No.: US 8,711,656 B1
(45) Date of Patent: Apr. 29, 2014

(54) SONIC FAST-SYNC SYSTEM AND METHOD FOR BLUETOOTH

(75) Inventor: Brett Paulson, Palo Alto, CA (US)

(73) Assignee: Verifone Systems, Inc., San Jose, CA (US)

(*) Notice: Subject to any disclaimer, the term of this patent is extended or adjusted under 35 U.S.C. 154(b) by 611 days.

(21) Appl. No.: 12/942,996

(22) Filed: Nov. 9, 2010

Related U.S. Application Data

(63) Continuation-in-part of application No. 12/870,767, filed on Aug. 27, 2010.

(51) Int. Cl.
*H04B 11/00* (2006.01)

(52) U.S. Cl.
CPC ...................................... *H04B 11/00* (2013.01)
USPC ......................................................... 367/135

(58) Field of Classification Search
USPC ......................................................... 367/135
See application file for complete search history.

(56) References Cited

U.S. PATENT DOCUMENTS

| | | | |
|---|---|---|---|
| 2006/0065709 A1* | 3/2006 | Yamashita | 235/375 |
| 2007/0069897 A1* | 3/2007 | Bauchot et al. | 340/572.1 |
| 2008/0228498 A1* | 9/2008 | Gasque | 704/276 |
| 2010/0015919 A1* | 1/2010 | Tian | 455/41.2 |
| 2010/0056124 A1* | 3/2010 | Keating et al. | 455/418 |
| 2010/0081377 A1* | 4/2010 | Chatterjee et al. | 455/41.1 |
| 2010/0081473 A1* | 4/2010 | Chatterjee et al. | 455/559 |

* cited by examiner

*Primary Examiner* — Isam Alsomiri
*Assistant Examiner* — James Hulka
(74) *Attorney, Agent, or Firm* — Leland Wiesner; Wiesner and Associates

(57) ABSTRACT

A method, apparatus and computer program product for fast-synching a wireless Bluetooth connection using a first device's wireless identifier is provided. One implementation of the present invention modulates the wireless identifier as a sonic Bluetooth code over a sonic carrier signal. To send the wireless identifier, one implementation accesses a storage area associated with the first wireless device holding the sonic carrier signal. Aspects of the invention then transmit the sonic Bluetooth code as modulated over the sonic carrier signal. A sonic transducer, such as a microphone on the second wireless device, receives the sonic carrier signal and wireless identifier for demodulation. In response, the second wireless device requests to establish a physical channel with the first wireless device using the wireless identifier received over the sonic carrier signal.

10 Claims, 13 Drawing Sheets

SONIC FAST-SYNC SYSTEM AND METHOD FOR BLUETOOTH

CROSS-REFERENCE TO RELATED APPLICATION

This continuation-in-part application claims benefit of U.S. Pat. No. 8,514,662 (application Ser. No. 12/870,767), filed Aug. 27, 2010 and titled "Sonic Communication System and Method" by Brett L. Paulson, assigned to the assignee of the present application and incorporated by reference herein for all purposes.

BACKGROUND OF THE INVENTION

Aspects of the present invention relate to Bluetooth communication.

Widespread availability and popularity of mobile devices have made them indispensible in both business and everyday use. These mobile devices include portable computing devices such as laptops, netbooks and tablets that provide mobile computing power as well as access to the information on the Internet, text messaging, email and other functions. Other mobile devices such as wireless phone devices not only provide the aforementioned portable computing functionality but further include wireless voice capabilities along with applications utilizing built-in cameras, global positioning satellite (GPS) services and others.

Convergence of mobile devices has resulted in a similar set of features offered in a variety of different form factors. Some of these shared features include powerful processors, increased battery life, larger displays, fully functional web-browsers, hi-fidelity sound systems and telephony capabilities. For example, wireless phone devices classified as smartphones may combine a small form-factor with powerful processors and multitasking operating systems previously available only on desktop computing devices. The smartphone device is generally small enough to fit in a pocket or purse and typically uses a touchscreen keyboard or miniature "thumb" keyboard for the easy entry of data.

Larger format portable computers deliver almost the same set of features as the smaller form-factor devices. Because they are larger, they deliver a longer battery life, more powerful computing power, wired/wireless networking and larger displays. Telephony is added to these devices using protocols/services such as voice-over-IP (VOIP) and Skype (Skype is a registered trademark in the United States and other countries of Skype Technologies S.A.).

Despite these many advances, mobile devices still have difficulty communicating directly with each other or, for that matter, desktop computers or workstations. When people wish to exchange information, they still generally send an email or text message with their mobile device to the mobile device of the person they are trying to reach. Likewise, mobile devices attempting communication with a desktop computer have little choice but to send the user of the desktop computer a brief email or text message as well. Unfortunately, manually entering information needed for emails or text messages is time consuming, prone to error and often dissuades people from interacting altogether.

Indeed, attempts to establish direct communication between mobile devices has been met with failure for a variety of reason. In many cases, too few devices have the specialized hardware required for communication. For example, infrared transceivers are not found on all mobile devices or computers and therefore lack the scale required to permit reliable communication. Moreover, infrared communication is not only slow but also requires a line-of-sight between the transceivers of the devices to operate.

Bluetooth communication is another interesting wireless protocol shared by many mobile devices but fraught with problems. In particular, the delay associated with "pairing" Bluetooth devices is unacceptable. Users trying to communicate or send data over Bluetooth may opt for a simpler method (i.e., copying data to a thumb drive or other removable storage) than spend the time it takes to establish and use a Bluetooth connection. Time delay associated with Bluetooth pairing not only frustrates users but tends to make the data transmitted more susceptible to interception and security breaches.

Pairing delay associated with setting up a Bluetooth connection also impacts it's more basic use as a substitute for wires and cables. In the case of Bluetooth headsets, many people would opt to use conventional headsets and wrestle with a tangle of wires than attempt to troubleshoot the problems associated with making a Bluetooth connection. Rather than miss or lose a phone call, many find it quicker and safer to plug a headset into the headset jack of phone device than rely upon Bluetooth pairing.

Some have suggested improving the pairing delay of Bluetooth using barcodes on the screen of a mobile device. This approach involves displaying and reading bar codes from the display of the mobile device to improve the Bluetooth pairing process. Special bar codes can generally be displayed on a mobile device and then read by another device or computer having a camera or bar code scanner. However, processing bar codes in this manner can be difficult as each display device may need to be configured with different display parameters, aspect ratios, display resolutions and other factors to ensure the bar codes can be read reliably.

SUMMARY

One aspect of the present invention includes storing a sonic carrier signal carrying a wireless identifier associated with a first wireless device. The wireless identifier not only identifies the first wireless device but facilitates establishing communication with a second wireless device in accordance with the Bluetooth protocol. One method and system of the present invention converts the wireless identifier and modulates it as a sonic Bluetooth code configured to be transmitted as sound when a sonic carrier signal is processed. A representation of the sonic carrier signal can be stored in a storage area on the first wireless device or in a storage area accessible by the first wireless device. If a file system is available, the sonic carrier signal may be stored as a file in the file system in accordance with an audio format. However, it is also possible to store the sonic carrier signal as a stream of binary data without the constructs of the file system.

Yet another aspect of the present invention includes facilitating Bluetooth communication from a first wireless device using a wireless identifier modulated over a sonic carrier signal. To send the wireless identifier, one implementation first accesses a storage area associated with the first wireless device where the sonic carrier signal is stored. A sonic Bluetooth code modulated over the sonic carrier signal includes at least the wireless identifier associated with the first wireless device. Next, one implementation of the invention then transmits the sonic Bluetooth code as modulated over the sonic carrier signal. A sonic transducer, such as a microphone on the second wireless device, receives the sonic carrier signal for demodulation and further processing. Aspects of the present invention receive a request from the second wireless device to establish a physical channel based upon the wireless identifier transmitted to the second wireless device over the sonic carrier signal.

Yet another aspect of the present invention concerns facilitating Bluetooth communication using a second wireless device. Initially, implementations of the invention prepare a transducer on the second wireless device to receive a sonic Bluetooth code modulated over a sonic carrier signal. For example, this may involve keeping the microphone and audio processing on the second wireless device in an "always-on" state ready to capture the sonic carrier signal at anytime. At some point in time, the sonic transducer receives a sonic Bluetooth code modulated over a sonic carrier signal representative of the wireless identifier associated with the first wireless device. Aspects of the present invention demodulate the sonic Bluetooth code from the sonic carrier signal to produce the corresponding wireless identifier associated with the first wireless device. The second wireless device transmits a request to the first wireless device to establish a physical channel in accordance with the Bluetooth protocol using the wireless identifier received over the sonic carrier signal.

BRIEF DESCRIPTION OF THE DRAWINGS

Like reference numbers and designations in the various drawings indicate like elements.

DETAILED DESCRIPTION

Figure 1:
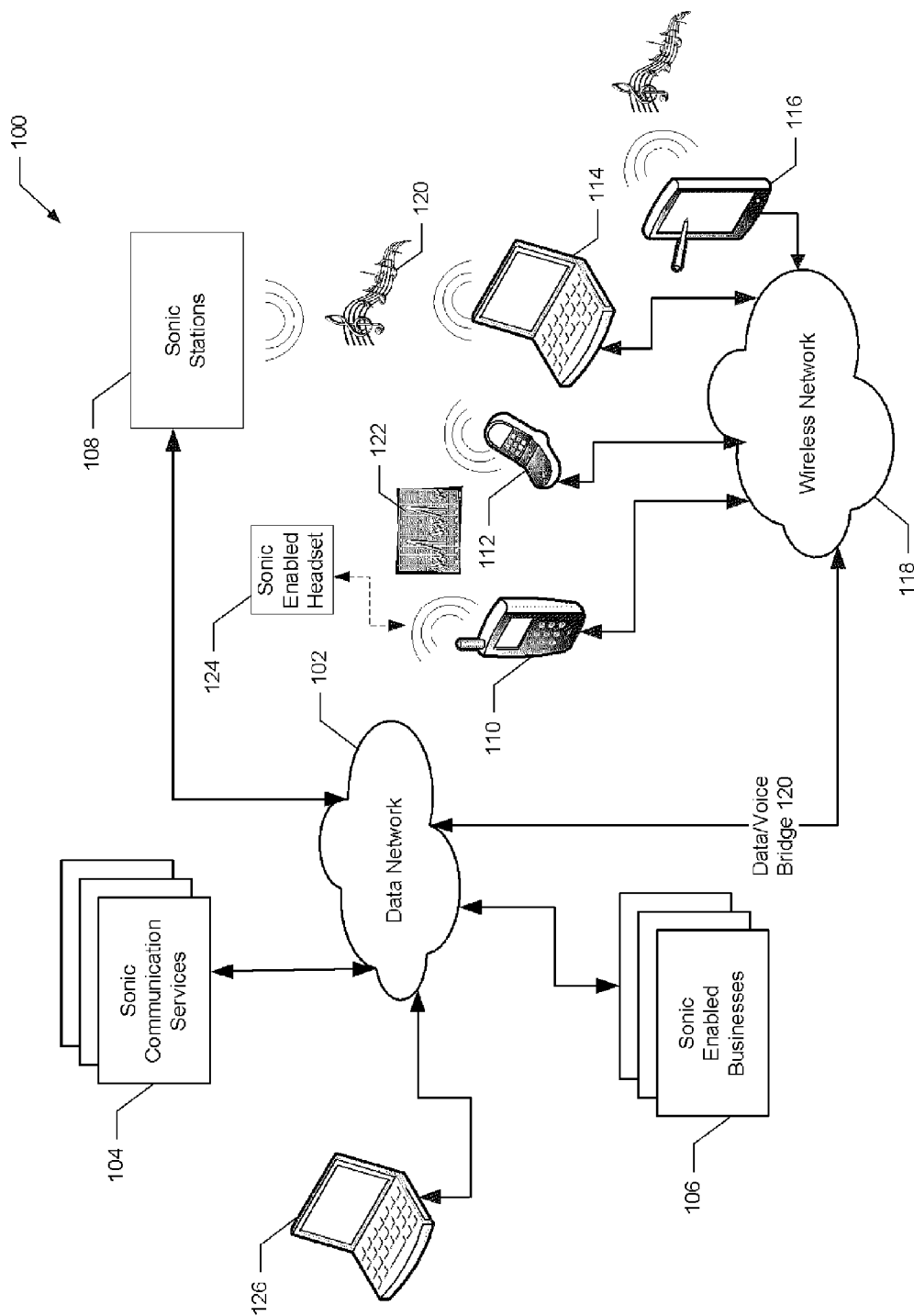
FIG. 1 is a block diagram illustrating a communication network in accordance with aspects of the present invention.

Aspects of the present invention provide a method and system for using a sonic carrier signal to connect Bluetooth devices together quickly. In particular, the sonic communication protocol of the present invention can be used to supplant the time consuming and frustrating process of device "discovery" that occurs between two or more Bluetooth devices. In one implementation, a special sonic Bluetooth code representing the wireless identifier of a first Bluetooth device can be transmitted sonically to a second Bluetooth device quickly and reliably. The second Bluetooth device can then use the wireless identifier to rapidly setup a Bluetooth connection with the first Bluetooth device and thus bypass the Inquiry substate of the Bluetooth protocol used during discovery.

Sonic Bluetooth fast-sync of the present invention is particularly valuable as it is compatible across a wide range of computers and mobile devices. Bluetooth devices with sound components and other supporting hardware that communicate sonically may implement aspects of the present invention. For example, many computers and mobile devices may already include CODECs, filters, digital signal processors (DSP), memory and other sound processing components needed to implement aspects of the present invention.

Bluetooth devices from different manufacturers may implement sonic fast-sync of the present invention. In part, this is because a sonic carrier signal of the present invention can be processed by mobile devices and computers from different manufacturers. It is therefore possible for various devices to fast-sync Bluetooth in accordance with the present invention while running on dissimilar hardware platforms and otherwise incompatible operating systems. For example, a wireless device running the Android operating system can readily communicate sonically with a computer device running Microsoft Windows, the Apple OS X operating system or an Apple iPhone or iPad (Windows is a registered trademark of Microsoft Corporation of Redmond, Wash., Android is a registered trademark of Google, Inc. of Mountain View Calif., iPhone and iPad are registered trademarks of Apple, Inc. of Cupertino, Calif.).

Bluetooth fast-sync and sonic communication implemented in accordance with the present invention also has considerable economic advantages. First, a majority of the hardware required for Bluetooth fast-sync is already installed on the computers and mobile devices of interest. Software designed in accordance with the present invention can therefore be installed on most devices without requiring as much as an upgrade. In some cases, there may be a nominal cost associated with attaching a microphone or speaker to the sound components already installed on the device. Even if the sound components are not already installed on these devices, there are many after market manufacturers of sound components and sound cards that can be combined with or added to existing hardware at a relatively low-cost. In some cases, it may even be cost-effective to create custom or semi-custom sound card designs using readily available CODECs and processors.

FIG. 1 is a block diagram illustrating a communication network 100 in accordance with aspects of the present invention. In one implementation, sonic communication services 104, sonic stations 108 and sonic enabled businesses 106 are operatively coupled together over a data network 102. Data network 102 can be the Internet or any other network.

Sonic enabled businesses 106 include any business implementing the sonic communication methods and systems designed in accordance with the present invention. These sonic enabled businesses may implement sonic communication services 104 to enable communication between computers and mobile devices in the course of selling their products or services. For example, sonic enabled businesses 106 may include social networking sites that implement aspects of the present invention and allow mobile devices to directly transmit their contact details to each other. Sonic enabled businesses 106 might also include retail businesses using sonic communication methods and systems of the present invention to accept payments, process gift cards, coupons, loyalty awards and other programs.

Sonic stations 108 represent one or more fixed points for distributing or receiving sonic communication in accordance with the present invention. Illustrative examples of sonic stations 108 may include point-of-sale (POS) registers for the sale of goods or services, kiosks distributing information at malls, museums or other public areas as well as any terminal used to facilitate any transaction of value with a mobile device or computer. The term value is meant to broadly include points in loyalty programs, prepaid telecommunications minutes, prepaid gift cards, airline mileage, digital music downloads, streaming music, streaming video, streaming multimedia as well as any other service or product of some worth to one or more parties.

Sonic communication services 104 facilitate processing certain portions of the sonic communications for sonic enable businesses 106 and any of the various devices coupled to wireless network 118. Implementations of sonic communication services 104 may include a combination of computers, servers, communications equipment and software designed, configured and created in accordance with the present invention. For instance, there may be software applications installed on servers encoding/decoding data modulated over sonic carrier signals in accordance with the present invention. It is also contemplated that communication equipment may be specially configured and/or embedded with firmware to support using sonic communication of the present invention and prioritize high value transactions such as involving electronic commerce. For example, the firmware may enable high-availability (HA) protocols for ensuring an orderly completion or roll-back of transactions when an unexpected communication failure occurs anywhere along the communication path downstream from the sonic communication services 104, between the devices coupled to the wireless network 118 or within systems supporting sonic communication services 104. Additional measures may also be taken to prioritize electronic commerce transactions above non-commercial transactions within sonic communication services 104 to ensure a more rapid processing of the data and resultant transactions among sonic stations 108 and devices coupled to wireless network 118.

In one aspect, sonic communication services 104 may include a set of preliminary or front-end services for managing the initial creation of data to be sent between devices. These front-end services may include authoring media such as audio files embedded with data modulated over one or more sonic carrier signals. Sonic communication services 104 can be used to author media with modulated data when it is not desirable to perform the modulation directly on a device or devices using sonic communication. For example, it might be advantageous to use sonic communication services 104 to install an audio file with modulated data on a device during manufacture.

The data may be used to identify the device when the audio file is played back and demodulated by another device in accordance with the present invention. Depending on the device, sonic communication services 104 may store the audio file in non-volatile random access memory (NVRAM) during manufacture such as flash memory, read-only memory (ROM), programmable ROM (PROM), or erasable PROM.

Further aspects of sonic communication services 104 may include back-end services that help facilitate more complex transactions between two or more devices using sonic communication of the present invention. Devices registered with sonic communication services 104 receive identifiers sonically transmitted to each other during a transaction. Sonically enabled devices receive these identifiers and may then forward to sonic communication services 104 over data network 102 where the identifiers are further processed and associated with their respective registered devices. For example, sonically enabled devices may include any combination of sonic stations 108 and the various devices coupled to wireless network 118 illustrated in FIG. 1. Once devices are positively identified, various types of transactions can be performed securely and robustly in a variety of circumstances.

Some sonic enabled businesses 106 may choose to utilize sonic communication services 104 over data network 102 based upon a software as a service (SaaS) model. The SaaS model can be used to deliver sonic communication services 104 in accordance with aspects of the present invention on a subscription basis. Typically, pricing depends on the time period and volume of use with respect to sonic communication services 104. Delivering sonic communication services 104 over a network in this manner can also be referred to as a "cloud computing" solution as the local devices take advantage of software services and processing power located remotely on computers across a network.

Instead of the SaaS or cloud computing model, alternate implementations may instead install sonic communication services 104 on a dedicated computer or appliance located on the business premises. The locally installed appliance solution gives businesses more direct access and control over the computers and software running sonic communication services 104. Advantageously, the appliance solution enables businesses to better control the reliability and availability of sonic communication services 104 with redundant systems, virtualization and increased monitoring. Moreover, the locally installed appliance with sonic communication services 104 might save money for a business provided the annual license fee and appliance costs are less than equivalent subscription fees.

Yet another implementation delivers sonic communication services 104 partially using a cloud computing model and partially as an appliance. Frequently used functions requiring higher performance from sonic communication services 104 may be preloaded on the locally installed appliance. Less frequently used functions not available locally are accessed from sonic communication services 104 in the cloud. The sonic communication services 104 delivered partially as an appliance and partially in the cloud has the optimal combination of benefits from both modalities of delivery.

A wireless provider may provide a data/voice bridge 120 connecting various devices over wireless network 118 to data network 102. In general, wireless network 118 provides voice communication capability between some or all of the devices registered on the wireless network 118. Data services like Internet or intranet access and SMS text messaging may pass through wireless network 118 and onto a data channel portion of the data/voice bridge 120. Data/voice bridge 120 can also serve to connect wireless network 118 to other data and wireless networks (not shown).

In this example, devices on wireless network 118 may include wireless smartphones 110, conventional mobile phones 112 (also referred to as mobile feature phones), laptops 114 and smartbooks 116. In addition to transmitting voice, some of the more sophisticated mobile devices such as smartphones 110 have powerful processors, larger data storage capacity and the ability to display high resolution images and text in various fonts and point sizes on larger screens. Mobile devices provisioned on wireless network 118 generally have a phone number and the ability to place a voice call to other mobile devices. Wireless phone providers for wireless network 118 may implement any one or more different wireless protocols including Global System for Mobile (GSM), Code Division Multiple Access (CDMA) and variants compatible with one or more features of these technologies.

Mobile devices on wireless network 118 such as smartphones 110 may use a data protocol such as TCP/IP to access data network 102 through data/voice bridge 120. These mobile devices have built-in modems to access wireless network 118 and sufficient computing power to process the associated data protocol for accessing data network 102. Certain other devices such as laptops 114 and smartbooks 116 have also been equipped with modems to both wireless network 118 and data network 102.

Alternatively, aspects of the present invention also works with mobile devices such as laptop 126 connected directly to data network 102. Laptop 126 bypasses wireless network 118 and accesses data network 102 directly using either a wired connection such as Ethernet over a physical medium such as CAT5/6 or a wireless medium such as Wi-Fi, Wi-MAX or others. It is also contemplated that any or all of the devices on wireless network 118 may also communicate directly with data network 102 if they are further equipped with Wi-Fi, Wi-MAX or other wireless data communication and protocols.

Sound components and capabilities are essential to making sonic communication of the present invention operate. Fortunately, laptops 114/126, smartphones 110, conventional mobile phones 112, and smartbooks 116 generally have sound components that digitally process sound at high-sample rates and a wide frequency response. Indeed, even a wireless headset 124 can use aspects of sonic communication in accordance with the present invention provided the CODEC in the headset has a sufficiently high sample rate and reproduces sound over a wide enough frequency response.

In general, sonic stations 108 have built-in sound components to facilitate performing sonic communication in accordance with the present invention. For example, many retail point-of-sale registers and kiosk systems are based upon computer platforms with sound components that digitally process sound with a high sample rate and wide frequency response. To communicate with sonic stations 108 lacking these sound components, it may be necessary to install sonic transducers and sound components to process sound and either transmit or receive signals over a speaker or microphone respectively.

It should be appreciated that aspects of the present invention allow a wide range of communication to take place between the devices depicted in FIG. 1. In one example, sonic stations 108 can send data encoded in accordance with the present invention and mixed in with an audio stream that plays a recognizable "jingle" or music 120. People recognizing the music 120 playing in the audible range may then expect a decode application running on their mobile device and designed in accordance with the present invention to capture the music and decode the sonic data sent by sonic stations 108. Depending on the design, it is possible for a single POS register from sonic stations 108 to transmit the audio stream embedded in music 120 to more than one of laptops 114/126, smartphones 110, conventional mobile phones 112, and smartbooks 116 (i.e., a one-to-many communication). Likewise, alternate designs may effectively limit similar communications between a single POS register and a single mobile device (i.e., one-to-one communication).

Smartphones 110 and other devices coupled to wireless network 118 may also transmit and receive data encoded within an audio stream to each other in accordance with the present invention. These sonic communications may occur "silently" by omitting the audible musical cue or "jingle" and selecting a frequency and gain for the sonic carrier signal 122 inaudible to most people. Nonetheless, while the signal may not be detected by a person, microphones on the devices actively listening for sound will readily capture the sonic carrier signal 122 and decode the data for further processing.

Figure 2:
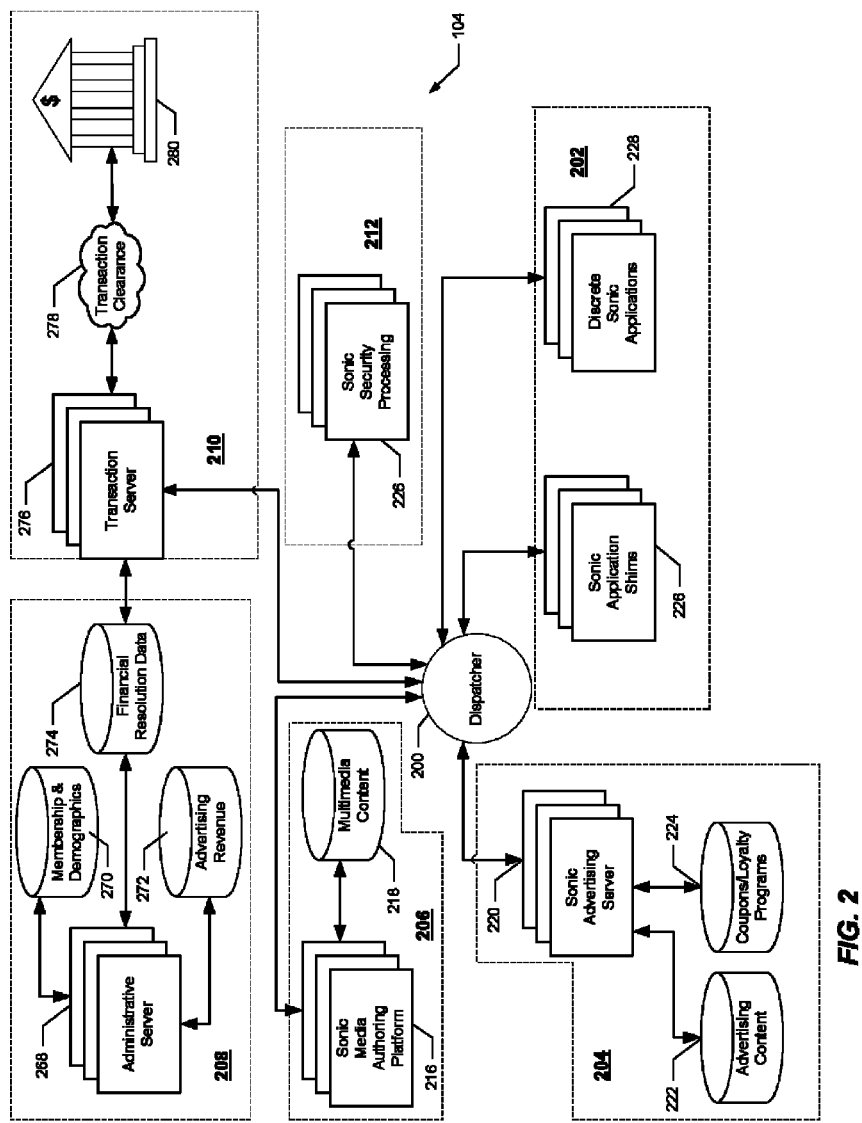
FIG. 2 is a schematic block diagram of the systems and methods for implementing aspects of sonic communication services in accordance with the present invention.

FIG. 2 is a schematic block diagram of the systems and methods for implementing aspects of sonic communication services 104 in accordance with the present invention. Since FIG. 2 is an illustrative schematic design, the actual organization of the functions could be combined or separated in a different manner other than how presented in this example. It is also contemplated that greater or fewer functions than those illustrated and described in conjunction with FIG. 2 could be included in accordance with systems and methods of the present invention.

Accordingly, sonic communication services 104 includes a dispatcher 200 that distributes processing of tasks to one or more areas of operations including a sonic application store 202, sonic marketing systems 204, sonic authoring systems 206, accounting systems 208, financial transaction systems 210 and sonic security systems 212. Each of these systems may be implemented with a combination of computers, communication equipment and software to distribute tasks and results.

Application store 202 includes applications implementing sonic communication designed in accordance with aspects of the present invention. Applications can be downloaded onto smartphones, feature phones, computers or other devices that communicate and transact with other sonically enabled devices. It is contemplated that sonic communication of the present invention will greatly enhance existing websites and applications as well as spawn the creation of entirely new functions and applications.

In general, the software in application store 202 can be divided into sonic application shims 226 and discrete sonic applications 228. Sonic application shims 226 provide developers with libraries and application programming interfaces (API) to add sonic communication features to their existing applications. Some sonic application shims 226 may provide general purpose APIs while other sonic application shims 226 may be tailored to the requirements of a certain class of applications. In comparison to a shim, discrete sonic applications 228 may be entirely new applications developed around the sonic communication features of the present invention.

Specifically, one sonic application shim 226 may include APIs for integrating sonic communications of the present invention with a particular social network platform such as Facebook, MySpace, Ning, Twitter, or Four-Square. Such sonic application shim 226 may allow in-person exchange of social network ids and data rather than over the Internet. Accordingly, mobile versions of these social websites enhanced with the present invention can allow subscribers to exchange personal information and contact information from their various social networks directly using their mobile devices.

In addition, APIs for social networking would further enable microlocation vis a vis strategically placed sonic stations 108. For example, a sonic station 108 placed in a supermarket would enable a mobile device user to accurately identify their location and then broadcast their location to other members of the social network. Microlocation facilitated by sonic communication of the present invention could be designed to work at various distances between the sonic station and a mobile device thus providing more accuracy than alternate solutions such as GPS (global positioning satellite) systems.

A further subset of the applications contemplated using sonic communications of the present invention include coupon-clipping, point-of-sale (POS) systems and paperless receipts, sonic payment systems, ringtone exchange, sonic voting, sonic data transfer and cloud-based storage, sonic dating matchup, sonic vending, video sharing, audio sharing, in-store discount systems, loyalty programs, gift-card management and redemption, and kiosk systems for information delivery.

In one implementation, coupon-clipping is an application on a mobile device that collects coupons sent sonically from a personal computer in accordance with aspects of the present invention. For example, a mobile device positioned near the speakers of a computer receives sonic codes encoded in the various articles, banner ads, display ads and click-thru advertisements found on websites on the Internet. As people visit these websites, the advertisements play audio modulated with the sonic codes. The audio is demodulated on the mobile device where the sonic codes may be exchanged for coupons or promotional items.

Alternatively, coupons may be delivered to the mobile devices in-store through sonic stations 108 strategically placed within a store. These sonic codes are also decoded on the mobile device and exchanged for electronic coupons and discounts downloaded into a coupon clipping application running on the mobile device. To redeem coupons, the mobile device may send corresponding sonic signals associated with the coupons to a POS system. The POS system securely processes the coupons and payment information and returns a paperless receipt to the mobile device once the product or service purchase is completed.

Sonic payment systems can also use sonic communication to transmit payment or value using debit, credit, cash, or other forms of monetary exchange such as with PayPal® (PayPal is a registered trademark of Ebay, Inc. of Sunnyvale, Calif.) These payments may take place between a mobile device and point-of-sale (POS) register, between mobile devices or between various combinations of other types of sonically enabled devices.

Ringtone exchange uses sonic communication to send ringtone codes representing downloadable ringtones to sonically enabled devices. For example, a mobile device may receive a sonic code over a speaker for downloading a ringtone onto the mobile device. The mobile device would then decode the sonic code and use it to access and download the ringtone over the Internet.

Sonic voting transmits sonic codes through a speaker and onto a mobile device whereupon the voting is initiated. These sonic codes for voting are decoded on the mobile device where the voters place their votes and send over the Internet. Sonic voting could be used in numerous contexts from local/state/federal elections to television shows having audience participation and voting. In the case of television broadcasts, the sonic codes can be transmitted during the broadcast over the television speakers to the mobile devices and users who then place their votes or voice their opinion as requested.

Sonic data transfer and cloud-based storage allows the storage and exchange of general data between two or more sonically enabled devices. For example, people can use sonic data transfer to move data from a work computer to a mobile device, cloud-storage or to some other location using sonic communication of the present invention.

Sonic dating matchup of the present invention allows people to opt-in or opt-out of sending personal information via a sonic carrier signal to other individuals in the geographic vicinity of a nightclub, supermarket or elsewhere. If they do opt-in, these individuals could then also selectively share more personal contact information such as a home address/phone number, on-line contact information, or email addresses.

Sonic vending applications would allow sonically enabled vending machines to receive sonic communication from a mobile device and dispense certain products or services. For example, a mobile device might send a sonic signal to a vending machine that gives the vending machine the ability to access a limited amount of money from a checking account or credit card and pay for the product or service. It is contemplated that the vending machine would use the Internet, a dial-up telephone line or other networks to securely access bank accounts, credit cards and other sources of money.

In one implementation, sonic marketing systems 204 manage marketing campaigns and placement of advertisements using sonic communication associated with aspects of the present invention. The sonic marketing systems 204 in this example include a sonic advertising server 220, advertising content 222 and coupons/loyalty programs 224. Advertising content 222 includes videos with audio, images with audio and also stand-alone audio authored with sonic codes. In one example, advertising content 222 and audio would be delivered when certain websites were accessed, when certain selectable elements on the websites are accessed by a user or from certain search results. Upon these or other similar events, sonic advertising server 220 would ensure delivery of the audio portion of the multimedia advertising content 222 authored with sonic codes embedded therein. Playing the audio back through the speakers of a computer or other system causes advertisements, coupons or other marketing materials to appear on the mobile device demodulating data from the sonic signal.

Coupons/loyalty programs 224 would be delivered in a similar manner to advertising content 222 except that a user would register in advance with a website in and opt-in to receiving coupons or loyalty bonus points. For example, a user might register with a retail website such as Starbucks® to receive coupons and be a member of their loyalty program (Starbucks is a registered trademark of Starbucks Corporation of Seattle, Wash.). Upon visiting certain websites, sonic advertising server 220 would deliver a retail ad for display that also sends an audio code to the user's mobile phone and gives them loyalty points and/or a coupon that they can redeem at a retail store such as Starbucks®. For example, loyalty points at a Starbucks could be redeemed for a free drink or possibly other benefits for obtaining a certain amount of points. Coupons from multiple vendors can be collected using single coupon clipping application stored on the mobile phone and redeemed on a POS register sonic communication of the present invention.

Authoring system 206 provides tools and applications that modulate sonic codes within a digital stream in accordance with aspects of the present invention. These tools and applications convert data into digital codes and modulate them over a sonic carrier signal within various types of multimedia content 218. In some implementations, authoring system 206 executes on a mobile device allowing the mobile device to directly modulate data over the sonic carrier signal in accordance with the present invention. Other implementations allow the mobile device to send data over a network like the Internet to a server where a server such as sonic media authoring platform 216 performs the authoring on behalf of the mobile device.

Accounting system 208 performs functions related to enrollment and generation of revenue for a sonic communication system in accordance with aspects of the present invention. In one implementation, accounting system 208 includes an administrative server 268, membership and demographics 270, advertising revenue 272 and financial resolution data 274. Administrative server 268 coordinates tasks between the various subsystems and updates one or more respective databases.

Membership and demographics 270 manages registration of members and also produces demographic information useful for selling marketing and advertising products and services. Microlocation information can also be collected if a sonic enabled mobile device is used to "check in" to a location with a fixed sonic device such as a sonically enabled POS register. In this context, membership and demographics 270 may not only provide detailed and updated purchase information on transactions but the location of a sonically enabled device and possibly how long the sonically enabled device is within a particular store or location before making a purchase. Financial resolution data 274 contains information for collecting revenue and payment to business partners using the sonic communication system.

Financial system 210 involves collection of revenue from advertising placement and other sonic communication services in accordance with aspects of the present invention. The financial system 210 includes a transaction server 276 for keeping track of financial events and transaction clearance process 278 to debit and credit funds from financial institutions 280. In one implementation, transaction clearance process 278 has the authority to securely interact with financial institutions 280 using automated clearing house (ACH) transfers, wire transfers, and credit cards to ensure a proper transfer of funds.

Sonic security processing 212 includes computers, communication devices and software for providing various types of security along with securely implementing aspects of sonic communication of the present invention. In one implementation, sonic security processing 212 uses sonic codes to implement public-private key management. For example, mobile devices can exchange public keys by modulating a public key as data exchanged through one or more sonic communication signals. Authentication of transactions may be implemented though a comparison of sound samples taken from the locale when and where the transaction occurs. Any or all parties to a transaction may be required to provide comparable sound samples if the transaction is to be honored. Conversely, if parties to the transaction have sound samples that differ beyond a threshold, the transaction between the two or multiple parties may be considered void.

Figure 3:
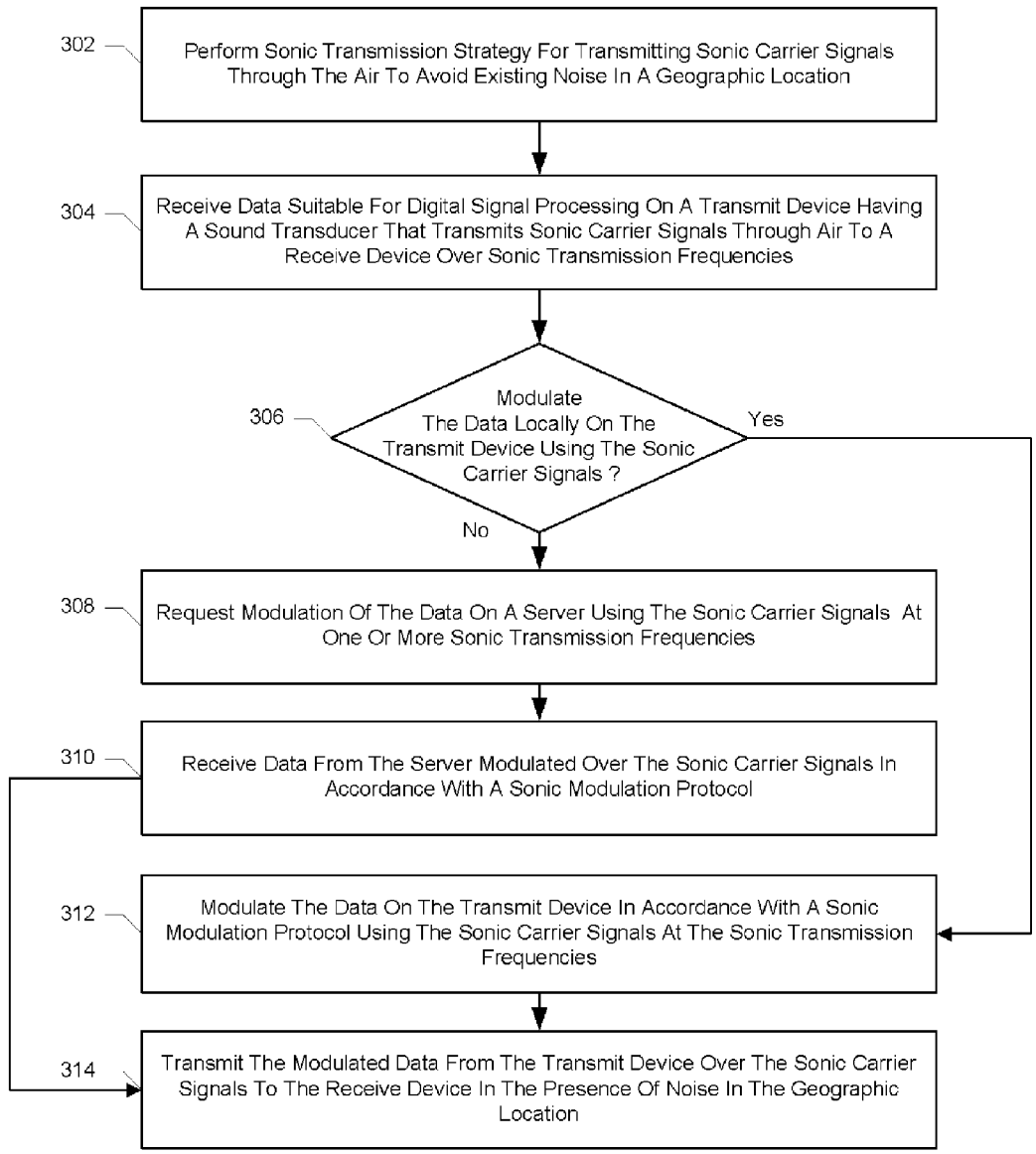
FIG. 3 is a flowchart representation of the operations for wirelessly transmitting data modulated over a sonic carrier signals in accordance with implementations of the present invention.

FIG. 3 is a flowchart representation of the operations for wirelessly transmitting data modulated over a sonic carrier signal in accordance with one implementation. Aspects of the present invention provide sonic transmission strategies for transmitting a sonic carrier signal while avoiding existing noise in a geographic location (302). Since sound transmission is unregulated, the full spectrum of sonic frequencies is generally available for use by the sonic communication system. For example, in a quiet environment a sonic communication system and method of the present invention aspects may be able to transmit over a sonic frequency range starting as low as 20 Hz and as high as 60 KHz. With a low level of noise, aspects of the present invention may achieve robust sonic communication using most if not all of the frequencies from within this sample range of sonic transmission frequencies.

In noisier environments, aspects of the present invention continue to achieve robust communication through careful selection of the sonic transmission frequencies and timing of the transmission. Samples of the ambient sound in the area are used to create a noise characteristic indicative of the most prevalent sounds. If the noise characteristic indicates that the desired sonic transmission frequencies are unavailable, aspects of the present invention may decide to delay transmission of the sonic signal a random interval of time, resample and then retransmit. A variant of this strategy may also determine that aspects of the present invention not only delay transmission but transmit sonic carrier signals multiple times in an effort to overcome a temporary use of the desired sonic frequencies in the area. For example, the noise of a coffee grinder in a coffee shop may fill a wide range of available sonic frequency spectrum for a very short period of time. Aspects of the present invention may delay one or more intervals of time until a subsequent sample of the sound indicates that the grinder has stopped and the sonic transmission frequencies are available. Details associated with the strategy process are described in further later herein with respect to FIG. 4.

Next, a transmit device receives data to be transmitted through air using the sonic carrier signals over the sonic transmission frequencies (304). The data may be binary information suitable for immediate signal processing or may be symbols such as alphanumeric data submitted through applications associated with short messaging service (SMS) communications, emails, or communications within social network services such as twitter, Facebook, MySpace, FourSquare and others. Generally, the transmit device receives data from these applications or others through a set of application programming interfaces (APIs) incorporated into the sonic transmission method and system. Alternatively, it is also possible for a user to enter data directly into the sonic transmission method and system of the present invention through keystrokes captured by a data entry interface.

Data received on the transmit device may further include sonic codes that indirectly access data in databases and other lookup-type services. For example, data transmitted from the transmit device to the receive device might be a sonic code corresponding to a credit card or bank account entry in a database located on one or more servers in accordance with aspects of the present invention. If alphanumeric or other symbols are used for these sonic codes, the symbols may first be converted into a digital stream of data for further processing.

To send and receive the sonic communication signal, both the transmit device and the receive device should each have at least one and possibly two sonic transducers. For example, the sonic transducer on the transmit device for sending the sonic carrier signal can be a speaker and the sonic transducer on the receive device can be a microphone. It is also possible that a single sonic transducer could be used for sending and receiving the sonic carrier signal depending on the implementation and overall system requirements.

Next, aspects of the present invention determine if the data should be modulated over the sonic carrier signal locally on the transmit device or remotely using a server (306). To conserve processing on the transmit device, aspects of the present invention may send the data to the server for processing and modulation (306-No). Modulation on the server may be necessary if the transmit device has limited storage or processing power such as with a basic mobile phone or feature phone. In one implementation, the transmit device sends the data over a network for modulation on the server at one or more sonic transmission frequencies (308). Once the server completes the modulation, the transmit device receives data back from the server modulated in accordance with a sonic modulation protocol designed in accordance with the present invention (310).

The server modulates the data on a sonic carrier signal using the specified sonic transmission frequencies in accordance with a sonic modulation protocol. For example, the server may use multiple sonic transmission frequencies to implement a protocol based upon frequency shift key modulation (FSK). In accordance with one implementation, the FSK protocol generally transmits over at least two different frequencies—a "1" may be transmitted on one sonic transmission frequency while a "0" may be transmitted on another sonic transmission frequency. While FSK is one useful modulation protocol, alternate modulation protocols may also be used including minimum shift keying (MSK), quadrature phase shift keying (QPSK) and others.

If the transmit device has sufficient processing and storage capabilities, the data may be modulated on the transmit device (306-Yes). In this implementation, the transmit device modulates the data using the sonic carrier signals at one or more sonic transmission frequencies (312). As described later herein, the sonic transmission frequencies used by the sonic carrier signals may avoid interference with the noise in the locale using one or several different sonic communication strategies.

Next, the transmit device transmits the modulated data over the sonic carrier signals through the sonic transducer and over the air to the receive device (314). The present invention provides robust sonic communication even in the presence of noise. It is contemplated that gain of the sonic carrier signals should be adjusted to carry them the requisite distance to the receive device where data from the sonic carrier signal is demodulated.

Figure 4:
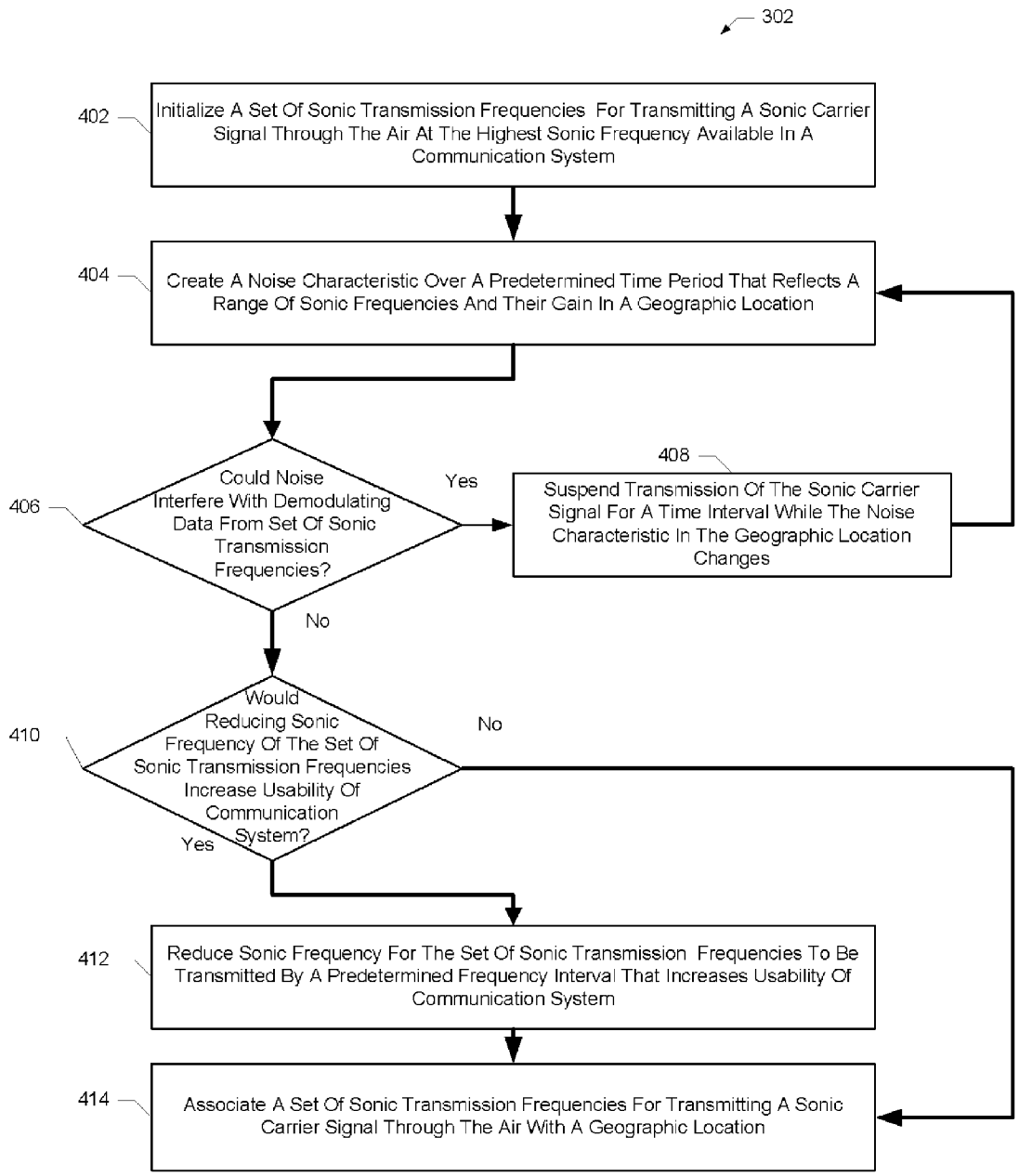
FIG. 4 is a flowchart representation of the operations for implementing sonic transmission strategies that reduce the probability of interference from noise in accordance with aspects of the present invention.

Further details on strategies to reduce the impact of noise on sonic carrier signals are provided by the flowchart in FIG. 4. Accordingly, aspects of the present invention initially set the sonic transmission frequencies to the highest frequencies available in a communication system (402). These frequencies are initially determined by the highest frequencies the transmit device can send and the receive device can detect and decode. This means that the transmit device must be able to modulate the data at these frequencies as well as have the output stage and transducer, such as a speaker, to reproduce these signals. For example, the transmit device should be equipped with a CODEC or functional equivalent that samples at least twice the sonic frequency being transmitted. Likewise, the receive device needs to be equipped with a similar type CODEC as well as a transducer, such as a microphone, sensitive enough to detect the sonic carrier signal and demodulate the data. Once again, the receive device sample rate should be at least twice the transmission frequency to accurately reproduce the sonic carrier signal.

Figure 5:
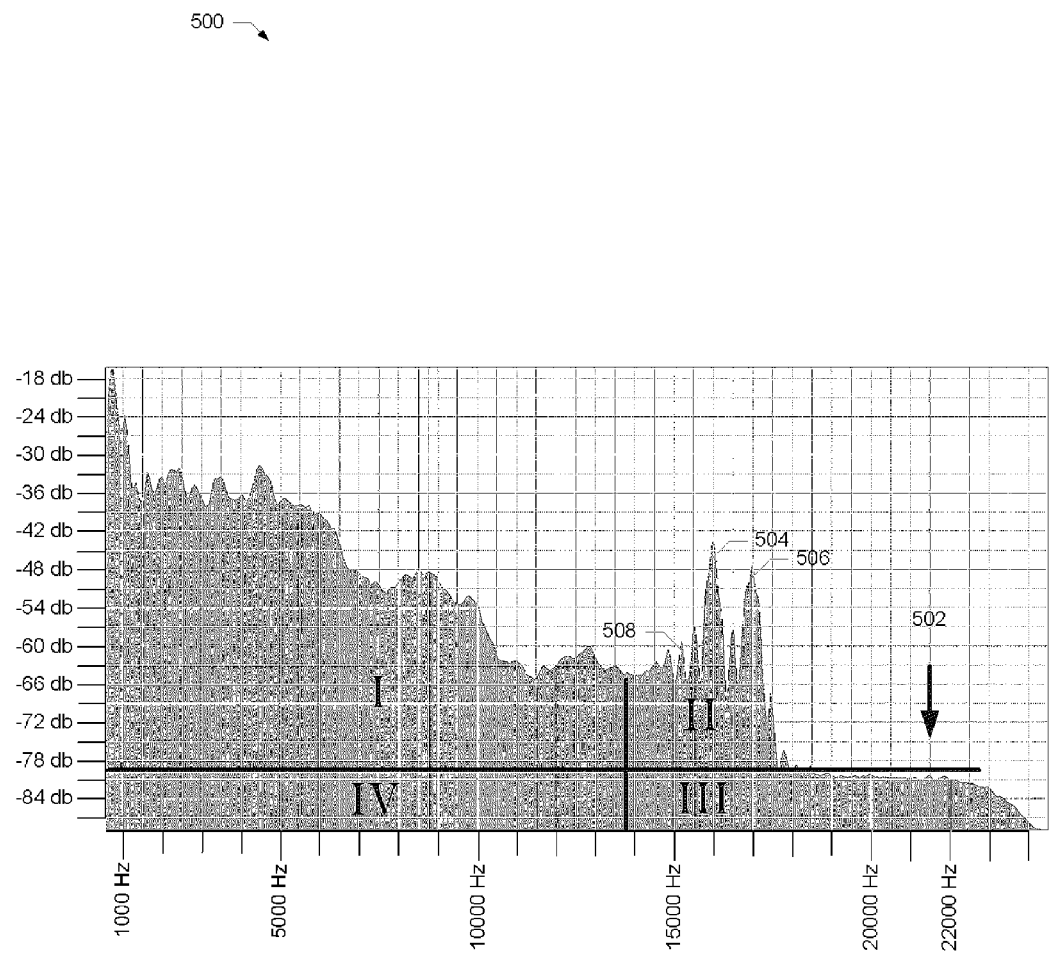
FIG. 5 is a one exemplary graph illustrating a sonic frequency response as received by a receive device in accordance with one implementation of the present invention.

Next, aspects of the present invention creates a noise characteristic over a predetermined time period that reflects a range of sonic frequencies and their gain in a geographic location (404). In one implementation, the noise characteristic is created by recording or "sniffing" a sample of the sound in a geographic location. Samples may be recorded once or multiple times over a period of seconds, minutes hours, days, or longer periods. FIG. 5 illustrates one example noise characteristic displaying gain and frequency along with sonic carrier signals of the present invention.

Using the noise characteristic, the present invention determines whether a receive device could potentially demodulate data from sonic carrier signals and sonic transmission frequencies (406). In one implementation, the noise characteristics are first analyzed to determine what sonic transmission frequencies, if any, are available within the sample or samples of the sonic spectrum. For example, a noise characteristic may reflect an absence of sonic noise in the range of 151 Khz to 22 Khz. Second, aspects of the present invention evaluates the sample rate and sensitivity of the receive device in light of the available sonic transmission frequencies. To demodulate the transmitted signals, the receive device should have a sample rate of at least twice the sonic transmission frequency. It is contemplated that the sample rate and other characteristics of the receive device are either known in advance or discoverable in accordance with aspects of the present invention.

It may be determined that the receive device is incapable of demodulating data transmitted over the set of sonic transmission frequencies (406-No). In one instance, the sonic transmission frequencies available according to the noise characteristic may be too high for the receive device to sample and demodulate. Alternatively, it is also possible that noise in the area covers a wide sonic spectrum leaving no sonic transmission frequencies available even at the highest frequencies of the communication system. In either of these or other situations, one implementation of the present invention suspends transmission of the sonic carrier signals for a time interval (408). During this interval, the present invention considers that the noise characteristic in the geographic location will change and make more sonic transmission frequencies available for the receive device to demodulate. In particular, it may be expected that a noise characteristic will change over the time interval and make the higher sonic transmission frequencies available for sonic communication. It is contemplated that this time interval can be a predetermined period of time or may be a random or pseudo-random period of time. Once the time interval expires, aspects of the present invention samples the noise characteristic yet another time (404) and processing continues.

Eventually, a set of sonic transmission frequencies are identified that the receive device is capable of demodulating (406-Yes). In one implementation, the present invention checks if the noise floor at these particular frequencies in the noise characteristic is low enough to not interfere with the transmission of sonic carrier signals at the sonic transmission frequencies. If the signal-to-noise (SNR) ratio at these frequencies is higher than a predetermined threshold, it is probable that the receive device could demodulate data when the sonic carrier signals are transmitted. In most instances, it is desirable to not reduce the sonic transmission frequencies as the higher frequencies may transmit with less interference from noise and other sound in the lower frequency range (410-No). For example, sonic carrier signals at the higher sonic transmission frequency may experience less interference from the audible sound in the lower frequency range.

In other instances, however, a reduction in the sonic transmission frequencies increases the usability of the sonic communication system and method (410-Yes). In particular, lowering the sonic transmission frequencies might be more comfortable for people hearing the signal transmitted between transmit and receive devices. For example, a person might be disturbed hearing a 17.5 kHz signal modulated with data, yet have no discernable reaction hearing a 15 kHz signal with the same modulated data. Decreased sonic transmission frequencies might also increase the usability as it affects the distance and direction a signal may travel (412).

Once identified, aspects of the present invention associate a set of sonic transmission frequencies for transmitting a sonic carrier signal with a geographic location (414). It is contemplated that the set of sonic transmission frequencies could be one or more frequencies needed to perform sonic communication in accordance with the present invention. For example, two or more sonic transmission frequencies might be used to implement an FSK protocol in accordance with the present invention.

FIG. 5 is a graphical representation of a noise characteristic 500 for a particular location in accordance with one implementation of the present invention. Four regions of this graph have been enumerated to better understand sonic communication of the present invention. Region I depicts the frequency and gain associated with noise sampled in the geographic area and generally includes the audible sound range. Region II reflects the sonic transmission frequencies suitable for sending sonic carrier signals in accordance with the present invention. In this example, sonic carrier signals 504 and 506 may be used for modulating data according to a sonic protocol such as FSK. Harmonics 508 are also within Region II and should also be considered when identifying and analyzing the sonic transmission frequencies used by the system. Indeed, while higher sonic transmission frequencies in Region II may be available, the sampling rate of the communication system may limit the highest frequency to a sonic frequency limit 502 as illustrated.

Region III reflects a noise floor associated with ambient noise generally considered above the audible frequency range. Many of frequencies in Region III are available for use by the sonic communication system and method of the present invention. In contrast, Region IV shows a more active region of sound and a noise floor within the audible range of sound. Fewer sonic transmission frequencies may be available for use by aspects of the present invention given the higher gain associated with the audible sounds in Region IV.

Figure 6:
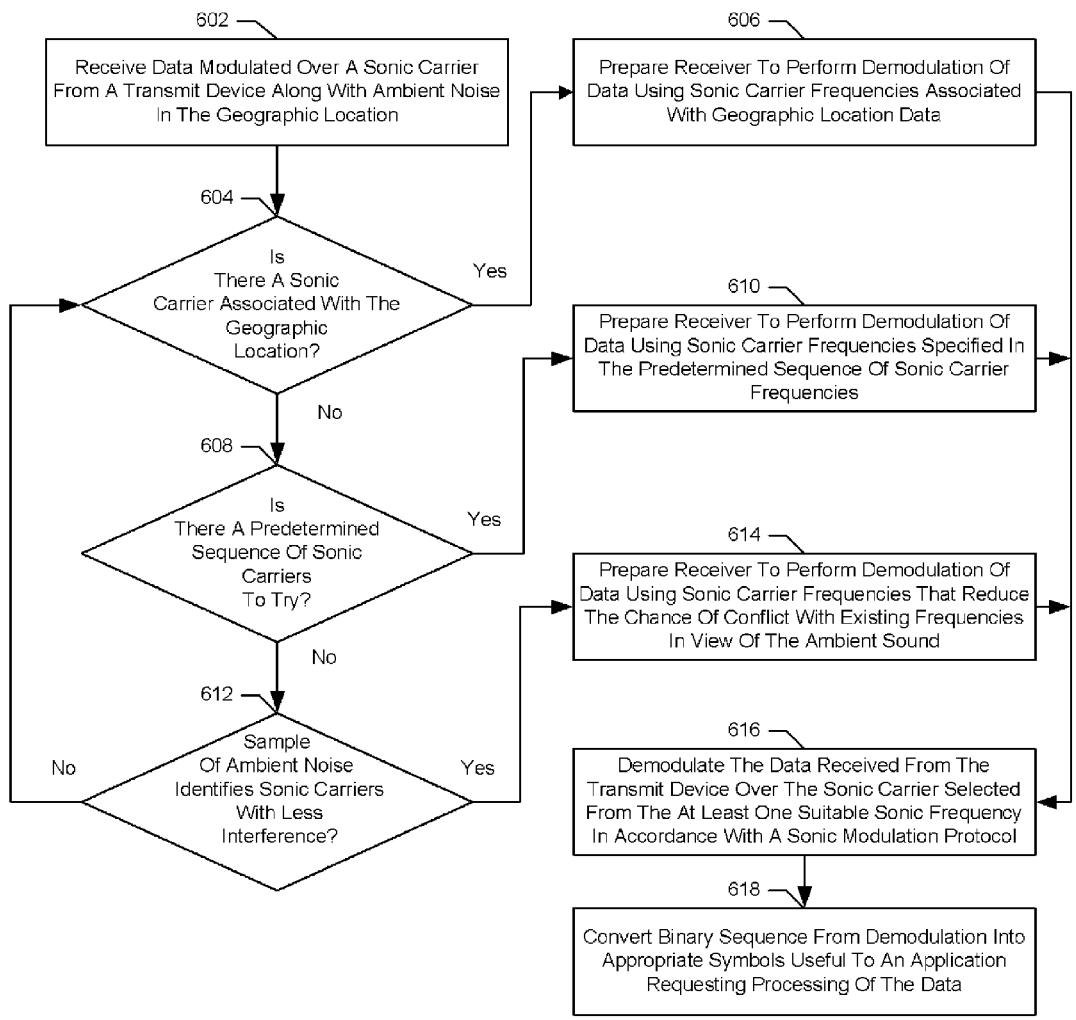
FIG. 6 is yet another flowchart representing the operations for wirelessly receiving the sonic carrier signals and data on a receiver device in accordance with one implementation.

FIG. 6 is yet another flowchart representing the operations for wirelessly receiving the sonic carrier signals and data on a receive device in accordance with one implementation. In this implementation, the receive device receives the modulated data over the sonic carrier signal from the transmitting device along with noise in the geographic location (602). A sonic transducer such as a microphone picks up the sonic carrier signal and noise in the area then provides it to a CODEC on the receive device. Noise may include ambient noise present in the area as well as any injected noise intentionally added to the sonic carrier signal. For example, a "jingle" or song may be injected into the audible range of frequencies that a person may hear and recognize. The CODEC samples the sound at a sufficiently high sample rate to accurately recover the transmitted sonic carrier signal. In general, the CODEC operates at a frequency of at least twice the frequency of the sonic carrier signal. For example, a CODEC operating at sample rate of at least 40 Khz can sample sonic frequencies at or slightly above the typical audible range of 20 Khz.

To recover the modulated data, aspects of the present invention may need to determine what sonic frequencies to demodulate. In one implementation, a determination is made whether there is a sonic carrier signal associated with a geographic location (604). For example, a busy retail location may need to use a higher sonic frequency for communication so as to avoid audible noise at lower frequencies from loud music, conversations, electrical appliances, doors shutting or other changes in the noise level at the location. As a result, one implementation may prepare a receive device to demodulate data from sonic carrier frequencies associated with a particular geographic location (606). For example, the GPS built into a phone can be used identify a geographic location and then determine the sonic transmission frequencies registered for use at the particular location.

In yet another implementation, the data may be modulated on a predetermined sequence of sonic carrier frequencies (608). Transmitting the modulated data over duplicate sonic carrier frequencies provides multiple alternative frequencies to demodulate by the receive device. Accordingly, a receive device may be configured to demodulate data using multiple predetermined sonic carrier frequencies (610). The receive device can select one or more of these sonic carrier frequencies or may demodulate the sonic carrier frequencies in a predetermined order. It is also contemplated that the receive device may select to demodulate the sonic carrier frequencies starting with the highest signal-to-noise ratio.

Alternatively, a sample of the ambient sound may be used to identify the sonic carrier frequencies with the least probable amount of interference (612) A sampling of the ambient sound may identify certain unused sonic frequencies available for the sonic carrier frequencies carrying the modulated data. Generally (614) unused frequencies are above the audible range of sound. Accordingly, aspects of the present invention would then prepare the receive device to perform demodulation of the data using these unused sonic frequencies (614). For example, if the data is modulated over multiple different sonic carrier signals than aspects of the present invention would first attempt to demodulate data from the signal carrier frequencies unused frequencies.

Once the frequencies of the sonic carrier signal are determined, the receiver device proceeds to demodulate the data received from the transmitter device in accordance with the sonic modulation protocol (616). As previously described, one sonic modulation protocol may be compatible with FSK while others may include MSK, QPSK or other protocols. The demodulated data appears as a binary sequence and is then converted into appropriate symbols for the application requesting the processing of the data (618).

Figure 7:
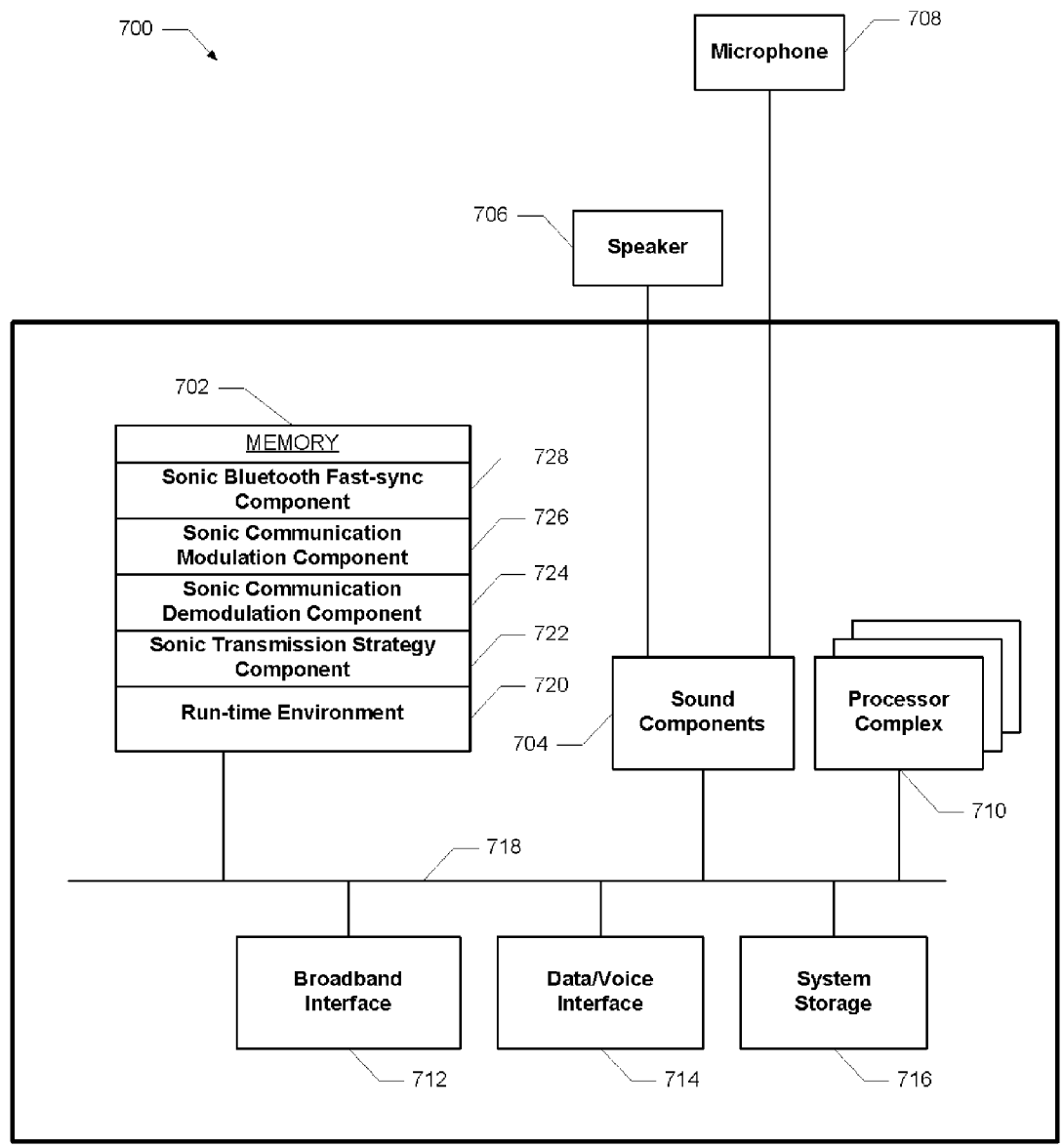
FIG. 7 is a schematic block diagram of a device capable of sonically transmitting and receiving data in accordance with implementations of the present invention.

FIG. 7 is a schematic block diagram of a device 700 capable of sonically transmitting and receiving data in accordance with implementations of the present invention. Device 700 includes a memory 702, sound components 704 with speaker 706 and/or microphone 708, a processor complex 710, a broadband interface 712, data/voice interface 714 and system storage 716. It is contemplated that aspects of the invention described herein with respect to device 700 may include any type of wireless phone, computer enabled devices (i.e., point-of-sale terminals, electronic billboards, kiosks) or general-purpose computers capable of performing sonic communication in accordance with the present invention. To that end, device 700 may also be broadly, and alternatively, referred to as a mobile device, wireless phone, smartphone, feature phone, computer, laptop computer, or smart book. It is also possible for device 700 to represent specific function devices such as a headset with or without Bluetooth capabilities implemented using discrete components, ASICs, systems on a chip (SOC) or other technologies that provide lower costs, compact packaging, or reduced power consumption. Some or all of the functions and components in device 700 may be used depending on the particular needs of the design and the implementation. Moreover, various aspects of the invention may include the same or similar components despite the particular implementation illustrated in FIG. 7.

Also, it is contemplated that different implementations may combine one or more of these components into a single component or may separate them into different combinations of components. For example, a Bluetooth headset may be implemented using digital signal processing (DSP) capabilities built into sound components 704 rather than a separate processor complex 710. The Bluetooth headset may be implemented without broadband interface 712 or data/voice interface 714. Indeed, the Bluetooth headset may not need discrete storage system storage 716 but instead use storage embedded within sound components 704 or elsewhere. Likewise, the Bluetooth headset may be implemented using sonic Bluetooth Fast-sync component 728 and run-time environment 720 rather than all of the components depicted in memory 702. In general, functionality provided by device 700 may be implemented in hardware, software or in various combinations thereof depending on the design decisions and implementation details.

In the illustrative implementation in FIG. 7, memory 702 includes storage locations that are addressable by the schematic processor and adapters for storing software program code and data. For example, memory 702 may include a form of random access memory (RAM) that is generally cleared by a power cycle or other reboot operation and classified as "volatile" memory. Processor complex 710 and various adapters may, in turn, comprise processing elements and logic circuitry configured to execute the software code and manipulate the data stored in the memory 702. System storage 716 may be a form of non-volatile storage for storing a copy of run-time environment 720, applications and other data used by device 700.

Memory 702 includes run-time environment 720 portions which typically reside in memory and are executed by the processing elements. Run-time environment 720 may be based upon a general-purpose operating system, such as Linux, UNIX® or Windows®, the AppleOS® or any other general-purpose operating system. It may also be based upon more specialized operating systems such as the Blackberry Operating system from RIM, Inc., the Symbian OS from Nokia, Inc., the iPhone OS or iOS from Apple, Inc., the Android operating system from Google, Inc. of Mountain View Calif., the Web OS or Palm OS from Palm, Inc. or any other operating system designed for the mobile market place. For certain devices like a Bluetooth headset that do not need a full operating system, run-time environment 720 may be a simplified scheduler.

Sonic transmission strategy component 722 includes functions and datasets necessary for identifying the sonic transmission frequencies and timing to transmit and receive data sonically in accordance with aspects of the present invention. For example, sonic transmission strategy component 722 may identify the sonic frequencies for transmitting data and to determine an optimal time for sonically transmitting the data. Sonic communication demodulation component 724 includes functions and datasets necessary to demodulate data from sonic carrier signals sent over various sonic transmission frequencies in accordance with a sonic communication protocol such as FSK modulation. Likewise, sonic communication modulation component 726 includes functions and datasets that encode data and modulate it over sonic transmission frequencies using a sonic carrier signal in accordance with the present invention.

To facilitate fast synching of Bluetooth devices, aspects of the present invention further include a sonic Bluetooth fast-sync component 728. The sonic Bluetooth fast-sync component 728 manages the use of a sonic carrier signal towards the establishment of a wireless connection between devices in accordance with the Bluetooth protocol. This may include managing the transmission of a sonic carrier signal modulated with a sonic Bluetooth code of the present invention. The sonic Bluetooth code may include a wireless identifier of a Bluetooth device as well as other values associated with Bluetooth protocol. For example, sonic Bluetooth fast-sync component 728 can be used in a Bluetooth headset to transmit the media access control (MAC) address of the Bluetooth headset modulated over the sonic carrier signal. This includes accessing data from a storage area on the Bluetooth headset holding the sonic carrier signal and then broadcasting the sonic carrier signal out of a speaker on the Bluetooth headset.

Generally, a Bluetooth headset will send this sonic carrier signal to a second wireless device such as a wireless phone device. Accordingly, the sonic Bluetooth fast-sync component 728 running on the wireless phone device operates to receive and demodulate the sonic carrier signal and obtain the wireless identifier associated with the Bluetooth headset. Aspects of the present invention then use the wireless identifier associated with the Bluetooth headset to bypass the conventional and time-consuming portion of Bluetooth discovery and accelerate the overall connection process. Sonic Bluetooth fast-sync of the present invention is described in further detail later herein.

Sound components 704 include CODECs and other components for converting sound transmitted through microphone 708 into a digital format (e.g., analog to digital converters—ADC) such as PCM (pulse-code modulation). These CODECs are also capable of converting the digital information back into a sonic analog signal (e.g., digital to audio converters—DAC) and then broadcasting through speaker 706.

Processor complex 710 may be a single processor, multiple processors or multiple processor cores on a single die. It is contemplated that processor complex 710 represents the one or more computational units available in device 700. Processor complex 710 may be include physical aggregations of multiple individual processors that each individually process and transfer data over interconnect 718. Alternate implementations of processor complex 710 may be a single processor having multiple on-chip cores that may partition and share certain resources also on the processor die such as L1/L2 cache. For at least these reasons, aspects of the present invention may be described as using a processor or multiple processors for convenience however it is contemplated that the term "processor" could also be applied to designs utilizing one core or multiple cores found on a single chip or die. Likewise, the term process is used to describe the act of executing a set of related instructions on one or several processors but it is also contemplated that alternate implementations could be performed using single or multiple threads executing the same or similar instructions on one or several processors each capable of multi-threaded execution.

Broadband interface 712 may be a WiFi, WiMAX or other connection to a network such as the Internet. The broadband interface 712 may also include wired connections to the Internet using CAT 5/6, Fiber Channel or similar. Data/voice interface 714 includes functions and datasets for transmitting data and voice over a wireless network. Protocols used for data/voice interface 714 may include one or more of GSM, CDMA, TDMA, FDMA or other wireless protocols. The data portions of data/voice interface 714 may carry data at 2G, 2.5G, 3G, 4G and beyond implemented using various wireless protocols including EDGE, EV-DO, HSPA, and others.

System storage 716 includes an area for storing applications, operating system portions, and data. It is contemplated that system storage 716 may be on non-removable flash or removable secure digital (SD) storage or other similar device and that the SD storage may be used for holding critical pieces of information such as credit card numbers and other similar information. Alternatively, system storage 716 may include or be associated with conventional magnetic tapes or disks, optical disks such as CD-ROM, DVD, magneto-optical (MO) storage or any other type of non-volatile storage devices suitable for storing different quantities of data. In general, system storage 716 may include storage accessed locally through a direct connection or remotely in a "cloud" through broadband interface 712 or the data channel made available through data/voice interface 714.

Figure 8A:
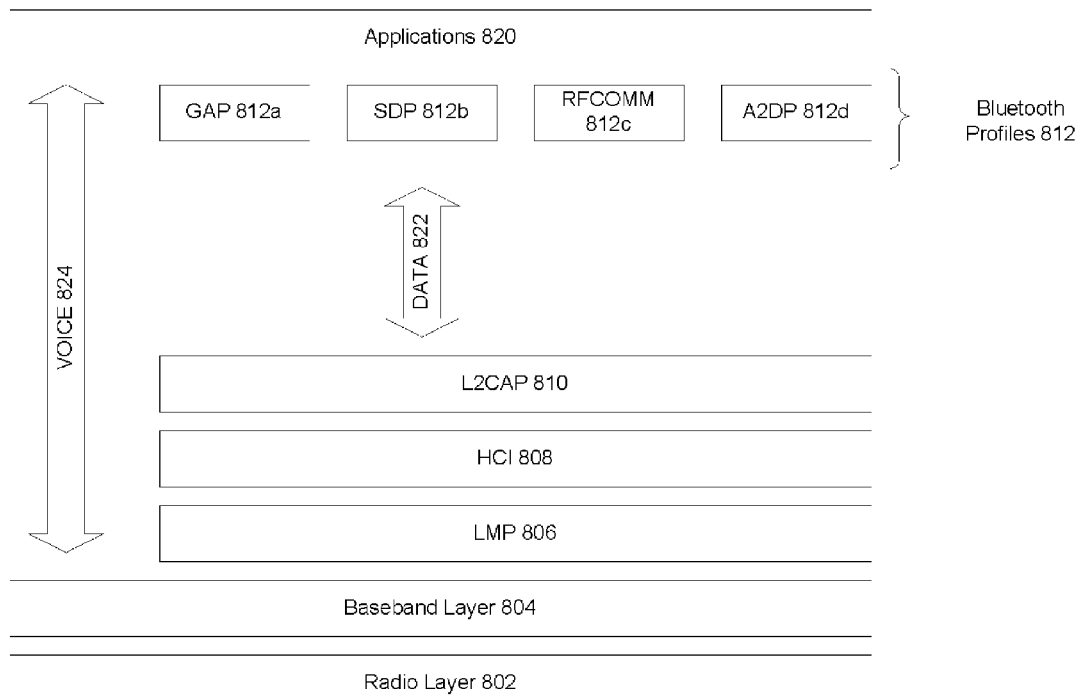
FIG. 8A depicts layers associated with a Bluetooth protocol stack used in accordance with aspects of the present invention.

FIG. 8A depicts layers associated with a Bluetooth protocol stack used in accordance with aspects of the present invention. Bluetooth is a wireless technology developed to connect nearby devices together and form adhoc networks referred to as piconets. The wireless Bluetooth connections in these piconets are used as a substitute for cables that would otherwise connect these devices together. For example, the Bluetooth protocol stack outlined in FIG. 8A may be used to connect Bluetooth headsets to wireless phones. Like their wired counterparts, the wireless Bluetooth connection between the headset and phone enables users to participate in phone calls using a speaker and microphone on the headset. Indeed, while aspects of the present invention may be used to quickly fast-sync Bluetooth headsets with wireless phones, it is contemplated that many other Bluetooth devices and/or applications would benefit from aspects of the present invention as well.

The Bluetooth protocol stack in FIG. 8A includes a radio layer 802, a baseband layer 804, a link manager protocol (LMP) 806, a host controller interface (HCI) layer 808, logical link control and adaptation protocol (L2CAP), various Bluetooth profiles 812 and applications 820. In one implementation, the radio layer 802 is the physical layer implemented using a fast frequency hopping wireless protocol in the 2.4 GHz frequency range with 79 channels spread 1 Mhz apart. By hopping channels many times a second, the radio layer 802 is able to avoid interference from other devices communicating in the same frequency range.

Baseband layer 804 packetizes data and controls how the packets are sent over the radio link 802. Voice 824 packets at baseband layer 804 are transmitted over a synchronous connection oriented (SCO) link but not retransmitted if there is a failure. Instead, time slot reservations for the SCO links ensure timely symmetric connections between the master and slave devices and better voice quality. Moreover, SCO link connections allow slave devices to respond using the time slot immediately after a master has made a transmission. Masters may have up to three SCO links with a single slave or multiple slave devices while slave devices can have up to two SCO links with other slaves.

Time slots not used for SCO links are free to carry data packets using an alternative asynchronous connectionless link (ACL). To maintain data integrity, packets on the ACL link are retransmitted in the event of packet failure. If the master specifically addresses a slave device on the ACL link, the slave device may respond during the next available time slot. When the master does not address a specific slave device then the communication on the ACL link is treated as a broadcast message.

Link manager protocol or LMP 806 uses lower level links setup by the baseband layer 804 to establish connections and manage piconets of the master and slave devices. LMP 806 delivers authentication, security and service quality monitoring services as needed by the other layers of the protocol stack.

Generally, the host controller interface or HCI 808 separates the hardware and software of a Bluetooth device thus the layers above it are implemented in software and layers below are implemented in hardware. Accordingly, HCI 808 provides the upper software layers such as the L2CAP 810 an interface to the physical bus layer below. In some cases, HCI 808 is optional and can be bypassed by the upper software layers.

Logical link control and adaptation protocol (L2CAP) 810 receives data 822 from Bluetooth profiles 812 and applications 820. The L2CAP 810 takes data from the various applications and adapts it to fit the Bluetooth protocol format, especially if there are certain implementation differences between manufacturers. Parameters associated with Quality of Service (QoS) are also typically managed through L2CAP 810.

Further up the protocol stack, Bluetooth profiles 812 provide interoperability between different Bluetooth devices and/or applications especially between different manufacturers and vendors. The Bluetooth profile defines certain minimum requirements for the roles and capabilities of certain types of applications. Devices and/or applications must conform to these Bluetooth profiles in order to interact—hence it is not sufficient to have a Bluetooth stack without the appropriate profiles.

FIG. 8A illustrates a subset of these Bluetooth profiles including a generic access profile (GAP) 812*a*, a service discovery profile (SDP) 812*b*, radio frequency communication profile (RFCOMM) 812*c* and advanced audio distribution profile (A2DP) 812*d*. GAP 812*a* provides a basis for all other profiles and describes generic operations that Bluetooth devices regardless of manufacturer must support. Those Bluetooth devices implementing GAP 812*a* are thereby assured the ability to exchange information with other devices and discover what applications are supported. At a minimum, Bluetooth devices implementing GAP 812*a* are able to establish a baseband link for the exchange of data.

Service discovery protocol (SDP) 812*b* provides a mechanism for Bluetooth devices to inquire other Bluetooth devices and identify the services they offer. Information related to these services is made available using the procedures defined in the SDP 812*b* profile. For example, a mobile phone device connecting to a headset can use SDP 812*b* to determine the various headset profiles supported by the particular headset and settings needed to connect to each profile. Supported headset profiles might include headset profile (HSP), a hands free profile (HF) or an advanced audio distribution profile (A2DP).

Radio frequency communication profile (RFCOMM) 812*c* emulates up to sixty RS-232 compatible serial ports and is available for use by other Bluetooth profiles. Telephony related Bluetooth profiles may use RFCOMM 812*c* as a carrier for the AT command set and applications such as a Bluetooth FAX. RFCOMM 812*c* can also act as a transport layer for performing binary exchange between devices over Bluetooth using the object exchange (OBEX) profile (not illustrated).

A2DP 812*d* is a Bluetooth profile used to stream high quality audio from one device to another device using wireless Bluetooth. This profile is often used to stream audio to higher quality Bluetooth speakers as well as headsets with higher quality and to car audio systems. Applications 820 may implement and combine these profiles along with additional logic to provide users with a variety of wireless applications.

Figure 8B:
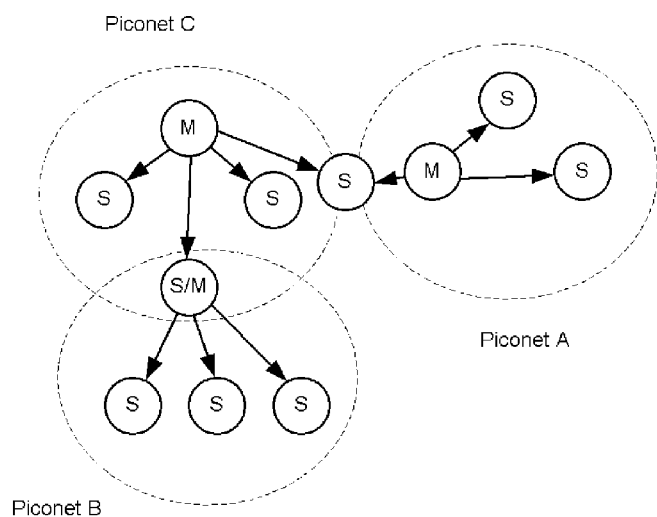
FIG. 8B illustrates the organization of Bluetooth devices in networks referred to as piconets in accordance with aspects of the present invention.

FIG. 8B illustrates the organization of these Bluetooth devices in networks referred to as piconets. According to the Bluetooth specification, a piconet can be made up of a master and up to seven active slave devices. A single master can communicate point-to-point with a single slave device or in a point-to-multipoint communication configuration with multiple slave devices. It can be seen in Piconet A that a single master communicates in a multipoint fashion with three slaves. Moreover, one slave in Piconet A can be shared with both a master in Piconet A as well as a master in Piconet C. Likewise, it is also possible for a master in one piconet such as Piconet B to also operate as a slave to another piconet such as Piconet C.

Bluetooth has various power consumption modes allowing devices to conserve resources while continuing to operate at various capacities. The Bluetooth devices in "active mode" participate in the communication channel on many levels and use a greater amount of energy. In active mode, a master regularly sends packets to the slaves through a "polling" operation. The slave devices may not only respond to the master with a packet but occasionally re-synchronize themselves. Generally, the transmission between devices lasts one time slot however a packet may be as large as five time slots in length. To help keep the communication organized, the master devices use even-numbered slots while the slave devices use odd number slots.

To further reduce power consumption, Bluetooth devices enter a "sniff" mode where the devices occasionally listen to communication on the piconet. Data transmission may be limited to the time frame these devices are sniffing data on the piconet. While devices in sniff mode are not considered "active", they do stay synchronized thus avoiding the energy consumption expended during the Paging substate and creation of a new connection.

Reducing power consumption even further, some devices may enter a "hold" mode that keeps devices synchronized but not active on the communication channel. A counter on the Bluetooth chip remains active while the rest of the device is essentially inactive. Once the hold period expires, the Bluetooth device will return to the "active" mode and continue transmitting data over the channel. "Park" mode is yet another even lower power mode that keeps the slave synchronized to the master without an active member address. Essentially, MAC addresses from the parked devices are released from the piconet. Like "hold" mode, devices in "park" mode are not active members of the piconet but can listen to a broadcast channel referred to as a "Beacon Channel".

Figure 9:
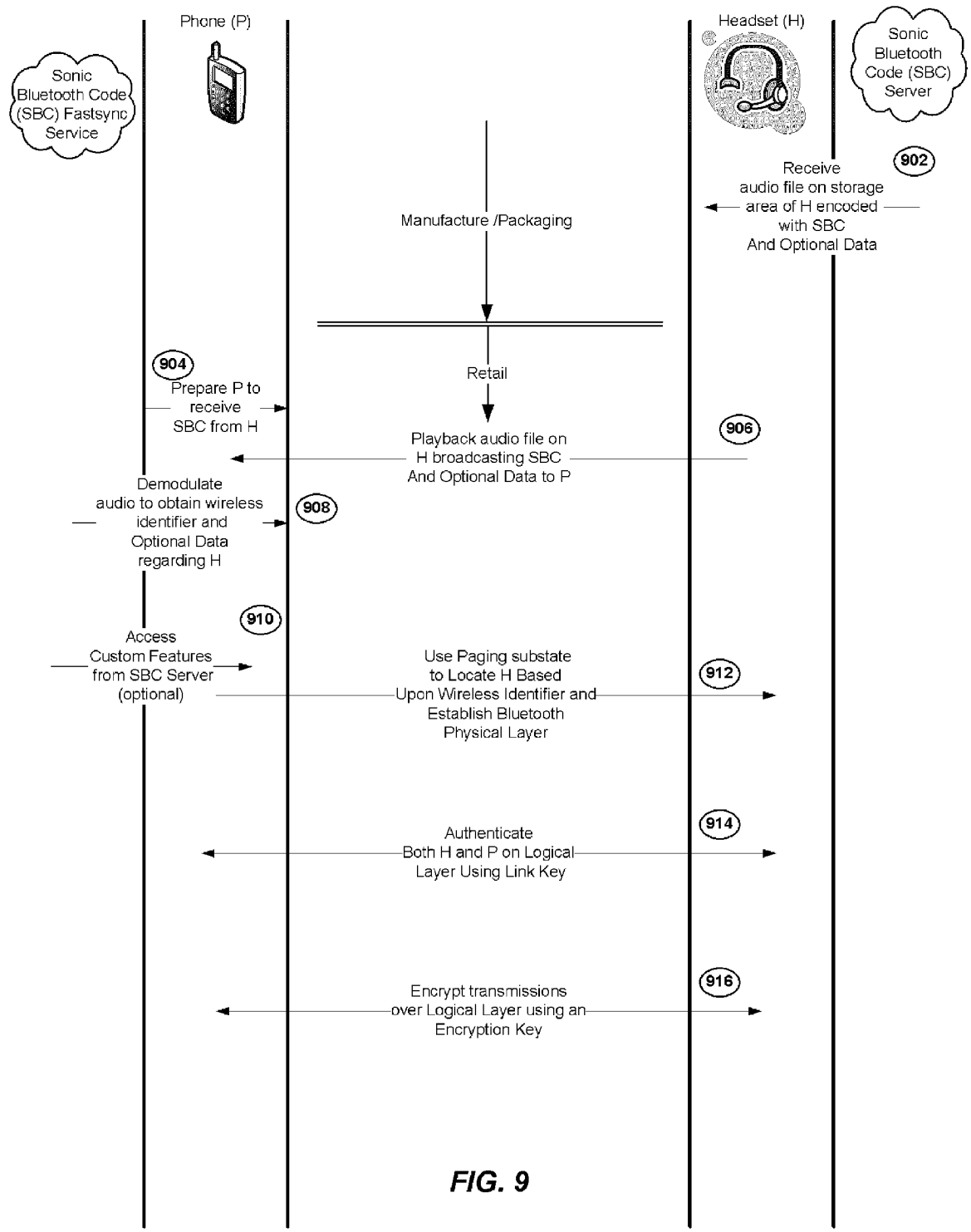
FIG. 9 illustrates the operations for implementing sonic Bluetooth fast-sync as between two Bluetooth devices in accordance with aspects of the present invention.

FIG. 9 illustrates the operations for implementing sonic Bluetooth fast-sync between two Bluetooth devices in accordance with aspects of the present invention. In one aspects, the sonic communication protocol of the present invention is used to bypass the time consuming Inquiry substate associated with conventional Bluetooth "discovery". This helps reduce the time it takes for two or more Bluetooth devices to establish a communication channel with each other. First, the master does not need to spend time in the Inquiry substate in order to discover the addresses of other Bluetooth devices. This may save as much as 10 seconds from the overall Bluetooth pairing operation. Likewise, slave devices using aspects of the present invention can deliver their addresses directly to the master device. Additional time is saved as the user does not need to select from among multiple Bluetooth devices detected within the area.

A sonic carrier signal of the present invention carries the wireless identifier associated with the Bluetooth device modulated out-of-band. In one implementation, the wireless identifier modulated over the sonic carrier signal is the MAC address of the device as it uniquely identifies each Bluetooth device. For example, a first Bluetooth device such as a Bluetooth headset can readily send the sonic carrier signal to a second Bluetooth device using the headset's speaker and built-in digital to analog converter (DAC). The second Bluetooth device—such as a wireless phone device—may use a microphone to capture the wireless identifier associated with the first Bluetooth device and modulated over the sonic carrier signal.

In operation and in reference to FIG. 9, sonic Bluetooth code (SBC) server converts a wireless identifier associated with a Bluetooth device into a digital sonic Bluetooth code for modulation. Next, the sonic Bluetooth code server modulates the sonic Bluetooth code onto a sonic carrier signal within an audio file in accordance with aspects of the present invention. It is contemplated that different data may be included in the sonic Bluetooth code in addition to the wireless identifier depending on how the Bluetooth devices are going to be connected.

One mode of connecting Bluetooth devices of the present invention may include an authentication key along with a wireless identifier in the sonic Bluetooth code. The authentication key is generally referred to in the Bluetooth protocol as a PIN and is used in conjunction with other data to create a link key for authenticating devices. However, it is contemplated that the authentication key may also include, as described in the Bluetooth protocol, other intermediate values leading up to creating the link key. For example, an authentication key may also refer to a value such as $K_{init}$ as it is an intermediate value that also contributes to the generation of the link key in the Bluetooth protocol.

Accordingly, the authentication key may also be modulated onto the sonic carrier signal along with the wireless identifier and included in the audio file. By sending the authentication key, it can be used later to programmatically help authenticate devices in accordance with the Bluetooth protocol. Further, instead of using a default authentication key value such as "0000", the authentication key may be set to any combination of values thus greatly increasing the overall security of the system when a connection is made. Moreover, there is no concern that the authentication key might be lost or misplaced since the authentication key is stored and sonically transmitted between Bluetooth devices.

In yet another mode of connecting Bluetooth devices, a link key may be incorporated along with the wireless identifier in the sonic Bluetooth code. Bluetooth devices that have a link key are considered 'bonded' as they have already completed the pairing process and have been authenticated. Consequently, including the link key as part of the sonic Bluetooth code further reduces the connection time between Bluetooth devices. For example, the Bluetooth channel may be established without entering the Inquiry substate as both the wireless identifier and the link key are known in advance. As a result, Bluetooth devices receiving the link key as part of the sonically transmitted sonic Bluetooth code may be authenticated over a Bluetooth channel almost immediately.

Another connection mode of the present invention may tailor the sonic Bluetooth code to include data for an out-of-band pairing mode referred to as Secure Simple Pairing (SSP). SSP is defined by the Bluetooth protocol and operates as a substitute for conventional pairing using out-of-band communication. Sonic communication of the present invention may be used for the out-of-band communication needed to exchange these predetermined parameters in accordance with the SSP protocol. For example, SSP uses the wireless identifier of at least one Bluetooth device along with other predetermined parameters to complete the paring process.

In each of these and other modalities, the resulting audio file is downloaded onto a storage area of a Bluetooth device either during manufacture or an after-market customization process. In one implementation, the storage area used to hold the audio file may be partitioned from the same storage area used to hold the firmware code and drive the functions of a Bluetooth headset device. Alternatively, the storage area used to hold the audio file may accessible by the firmware code of the Bluetooth headset device but located in a separate area. It is contemplated that the firmware may be customized and reinstalled after manufacture to both receive the audio file having the digital sonic Bluetooth code and optional data of the present invention and effectuate fast-sync functionality (902). It is also possible that the Bluetooth headset device may also receive one or more custom ringtones, updates or other features as part of this customization process.

To begin the connection process between Bluetooth devices, a second Bluetooth device is prepared to receive the sonic Bluetooth code from the first Bluetooth device through a transducer. For example, a wireless phone device may execute a sonic Bluetooth code fast-sync service that listens for the playback of the audio and modulated sonic Bluetooth code from the Bluetooth headset device (904). Accordingly, the Bluetooth headset device is manipulated to playback the audio file and broadcast the modulated sonic Bluetooth code to the wireless phone device (906). In one implementation, the sonic Bluetooth code fast-sync service on the wireless phone device receives the audio and demodulates the sonic Bluetooth code and obtains the wireless identifier of the headset (908). The wireless phone device may also receive other optional data modulated over the sonic carrier signal; the optional data is associated with the wireless identifier for later use. For example, the optional data may include an authentication key for use during subsequent Bluetooth authentication operations.

With reference to the wireless identifier, the phone device may use the identifier to optionally access custom features, data or other information from sonic Bluetooth code server (910). For example, the wireless phone device may download from the sonic Bluetooth code server a special ringtone associated with the particular wireless identifier (i.e., MAC address) of the Bluetooth headset and then loaded on the sonic Bluetooth code server when the headset was manufactured or customized.

In making the connection with the Bluetooth headset, the phone device bypasses the Inquiry substate as it has already received the wireless identifier of the Bluetooth device. In this example, the Bluetooth stack on the wireless phone device uses the wireless identifier to locate the headset through the Paging substate of the protocol (912). The wireless phone device Pages the specific wireless identifier address targeting the Bluetooth headset while in Page scanning mode. Since the Inquiry substate is bypassed, the clock offset for the mobile phone device and Bluetooth headset is also determined in the Paging substate. Generally, the Bluetooth protocol uses the system clock and wireless identifier of the master to find the proper clock offset and other parameters in the Paging substate. For example, the wireless identifier (BD_ADDR) of the master facilitates determining the frequency hopping sequence and a Channel access code; phase in the hopping sequence and clock offset is determined according to the system clock of the master. Once the Paging substate completes, a physical channel or connection is established between the wireless phone device and the Bluetooth headset matching the wireless identifier.

Next, a link manager (LM) uses a link manager protocol (LMP) to establish a logical channel between the wireless phone device and Bluetooth headset over the physical or baseband layer. Security is maintained over the logical channel by authenticating peers with a link key. If the link key already exists, the logical channel between the wireless phone device and Bluetooth headset is considered authenticated and the logical channel is established. Indeed, one implementation of the present invention may sonically transmit the link key in addition to the wireless identifier in the sonic Bluetooth code thus authenticating the logical channel if this link key is missing or deleted.

If the link key is otherwise not available, a new link key may be generated using an authentication key, a random number generator and a wireless identifier, which is unique for each Bluetooth device. The authentication under Bluetooth begins with one Bluetooth device initiating a challenge (Initiating Device) to another Bluetooth device (Non-Initiating Device) based upon a wireless identifier or Bluetooth address (BD_ADDR) and a link key. The Bluetooth protocol refers to using a combination link key for authentication however it is contemplated that other link keys might also be used for this process. The Non-Initiating Device may be authenticated or rejected depending on the response to the challenge and the value calculated for this link key.

In accordance with aspects of the present invention, the Initiating Device receives the wireless identifier (BD_ADDR) of the Non-Initiating Device in the sonic Bluetooth code over the sonic carrier signal rather than through the Inquiry substate. It is further possible to send the authentication key in the sonic Bluetooth code over the same sonic carrier signal. For example, a Bluetooth headset—acting as a slave device—may transmit it's wireless identifier and the authentication key in an sonic Bluetooth code over the sonic carrier signal to the wireless phone device acting as a master device.

In calculating the link key, the authentication key may be a default value such as '0000' that is both easy to remember and well-known in order to streamline the authentication process. However, aspects of the present invention also allows the use of a more secure custom authentication key values provided by the Bluetooth headset over the sonic carrier signal as previously described. Custom authentication key values can be used with similar ease of use as default values as the authentication key is stored on the device and transmitted sonically in accordance with the present invention. The user need not remember or even enter the custom authentication key value to take advantage of the increased security.

Once authenticated, the wireless phone device and Bluetooth headset may encrypt transmissions over the logical channel to communicate privately (916). In one implementation, a master device issues an encryption key to one or more selected slave devices on the piconet to be included in the private communication. Slave devices in receipt of the encryption key may then communicate with the master and other slaves over the encrypted logical channel.

FIGS. 10, 11, 12 and 13 provide additional details to the sonic Bluetooth fast-sync described in conjunction with FIG. 9.

Figure 10:
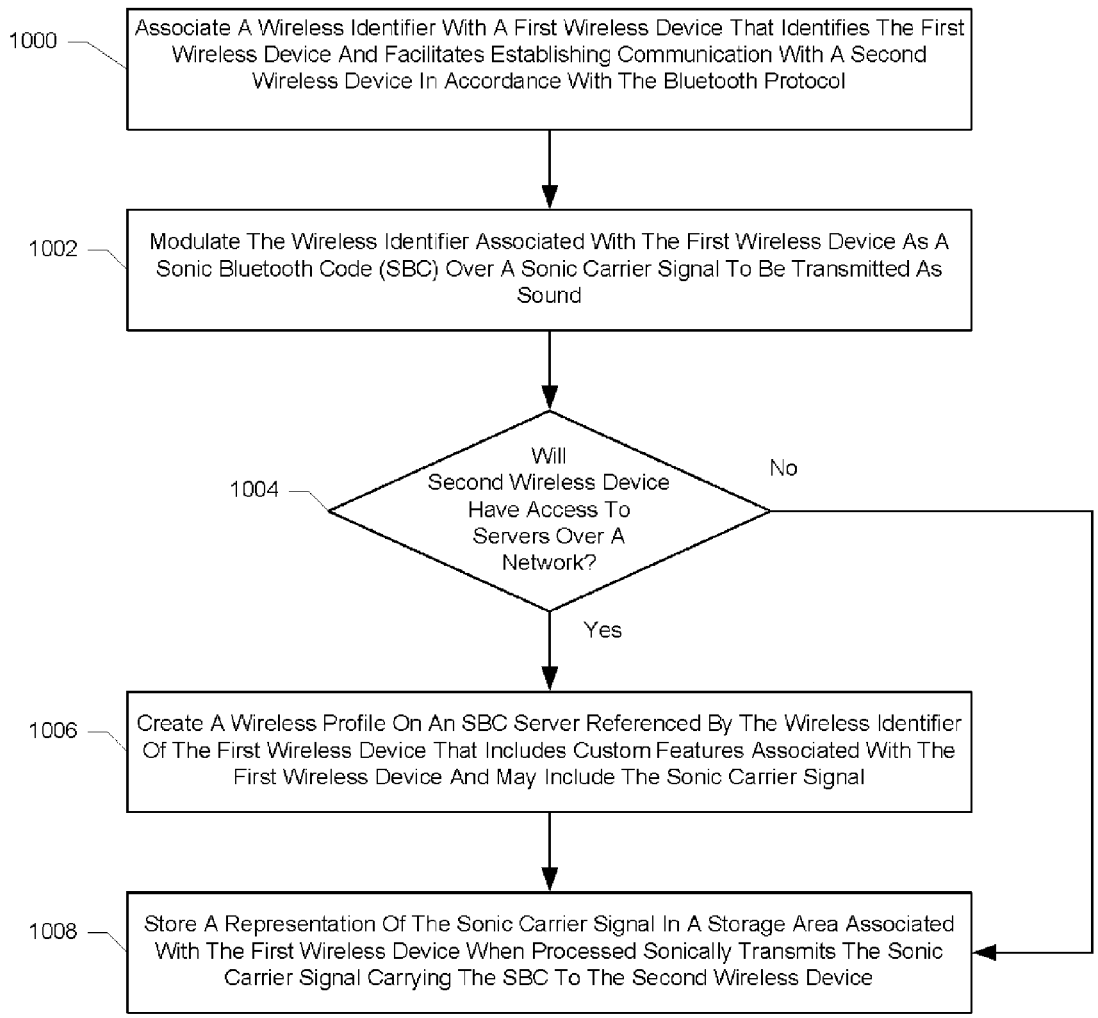
FIG. 10 is a flowchart diagram providing the operations associated with storing a sonic carrier signal on a storage area associated with a first wireless device in accordance with aspects of the present invention.

In particular, FIG. 10 is a flowchart diagram providing the operations associated with storing a sonic carrier signal in a storage area associated with a first wireless device in accordance with the present invention. For example, these operations could be used to store an audio file on a Bluetooth headset for sonic Bluetooth fast-sync in accordance with the present invention.

Initially, aspects of the present invention associate a wireless identifier with a first wireless device that identifies the first wireless device and facilitates establishing communication with a second wireless device over a Bluetooth channel (1000). With respect to the Bluetooth protocol, the wireless identifier may be the MAC address that uniquely identifies each Bluetooth device. The wireless identifier may be identified through a query to the Bluetooth stack associated with the device or maybe read directly from a label or engraving on the device. In one implementation, the first wireless device may be any number of devices selected from a set of wireless devices including: a monaural headset, a stereo headset, a mobile speakerphone that may be used in a car and a non-mobile speakerphone integrated into a car. It is also contemplated that the first wireless device might also be a computer, a wireless phone device, a television, a display device, picture frames, electronic billboards, medical devices and others. Indeed, the first wireless device may be any Bluetooth capable device that might benefit from connecting with another Bluetooth device quickly using the sonic fast-sync based protocol methods and systems of the present invention.

Next, aspects of the present invention modulate the wireless identifier associated with the first wireless device as a sonic Bluetooth code over a sonic carrier signal to be transmitted as sound (1002). In one implementation, the sonic Bluetooth code includes a digital representation of a MAC address which is typically identified as a string of twelve (12) hexadecimal digits found in six (6) bytes of data. For example, a Bluetooth MAC address might be AB: 02: C4: DE: FF: 59. This digital representation of the MAC or sonic Bluetooth code is then modulated in accordance with one implementation over one or more frequencies of the sonic carrier signal using frequency-shift keying (FSK) or other suitable protocols.

As previously described, the sonic Bluetooth code might also include a link key in addition to the wireless identifier for rapid authentication and connection with other devices. For example, the link key included in the sonic Bluetooth code may be the link key referred to in the Bluetooth protocol as a combination link key. It is also possible the link key could be other types of link keys provided in the Bluetooth protocol and would depend on the particular implementation and application.

In addition to the wireless identifier, it is contemplated that the sonic Bluetooth code might include the authentication key associated with the first wireless device. Specifying the authentication key in this manner would make it easy to use both default and customized authentication keys during the subsequent Bluetooth authentication operation. For example, a customized authentication key value of "4592" might be included as part of the sonic Bluetooth code as a way of increasing the security during authentication and establishment of the Bluetooth connection. As described in further detail later herein, the user would not have to remember nor enter this customized authentication key or even the default authentication key (e.g., '0000') as the second wireless device would receive and store the authentication key internally. This has the dual benefit of increasing ease of use while also increasing security during establishment of the Bluetooth connection.

Aspects of the present invention may optionally determine if the second wireless device will have access to servers over a network when the first and second wireless devices are eventually connected (1004). The second wireless device generally has access to servers over a network if it has an Internet connection or other broadband network connection. In the event the second wireless device does have such a broadband connection (1004-Yes), it becomes possible for the second wireless device to reference and access content associated with the first wireless device. Accordingly, aspects of the present invention may create a wireless profile on a server for storing additional data or content identified by the wireless identifier (1006). In one implementation, this wireless profile may be configured to access custom features associated with the first wireless device including: ringtones, screen savers, credits associated with loyalty programs and coupons. The wireless profile on the server may even include the authentication key used to authenticate devices on the Bluetooth logical link.

Alternatively, the second wireless device may not have an Internet connection or broadband connection thus limiting access to the wireless profile (1004-No). In this case, aspects of the present invention proceeds to store a representation of the sonic carrier signal in a storage area associated with the first wireless device. When processed, this sonic carrier signal transmits the sonic carrier signal carrying the sonic Bluetooth code (1008). In one implementation, the sonic carrier signal is stored as sound in an audio file using memory onboard the first Bluetooth device. For example, the audio file may be stored on a certain amount of flash built into a Bluetooth headset using the MP3 or WAV (PCM) file formats. It is also possible for the sonic carrier signal to be stored in a portion of the firmware embedded within the first Bluetooth device carved out for storing the sonic carrier signal of the present invention.

The sonic carrier signal may be stored on the first wireless device with or without the structure of a file or filesystem. In this case, aspects of the present invention might first identify a storage area associated with the first wireless device capable of storing the sonic carrier signal. The storage area could be an unstructured area that receives a stream of binary data. Or the storage area could be formatted and managed using a filesystem construct. Next, aspects of the present invention then writes the sonic carrier signal having the sonic Bluetooth code into the storage area for subsequent access during transmission of the sonic Bluetooth code. Once again, the sonic carrier signal may be written to comply with formats such as MP3 or WAV using a filesystem and file structure. To reduce the complexity and overhead of the file system, the sonic carrier signal may also be written without any structure as a stream of binary data.

Figure 11:
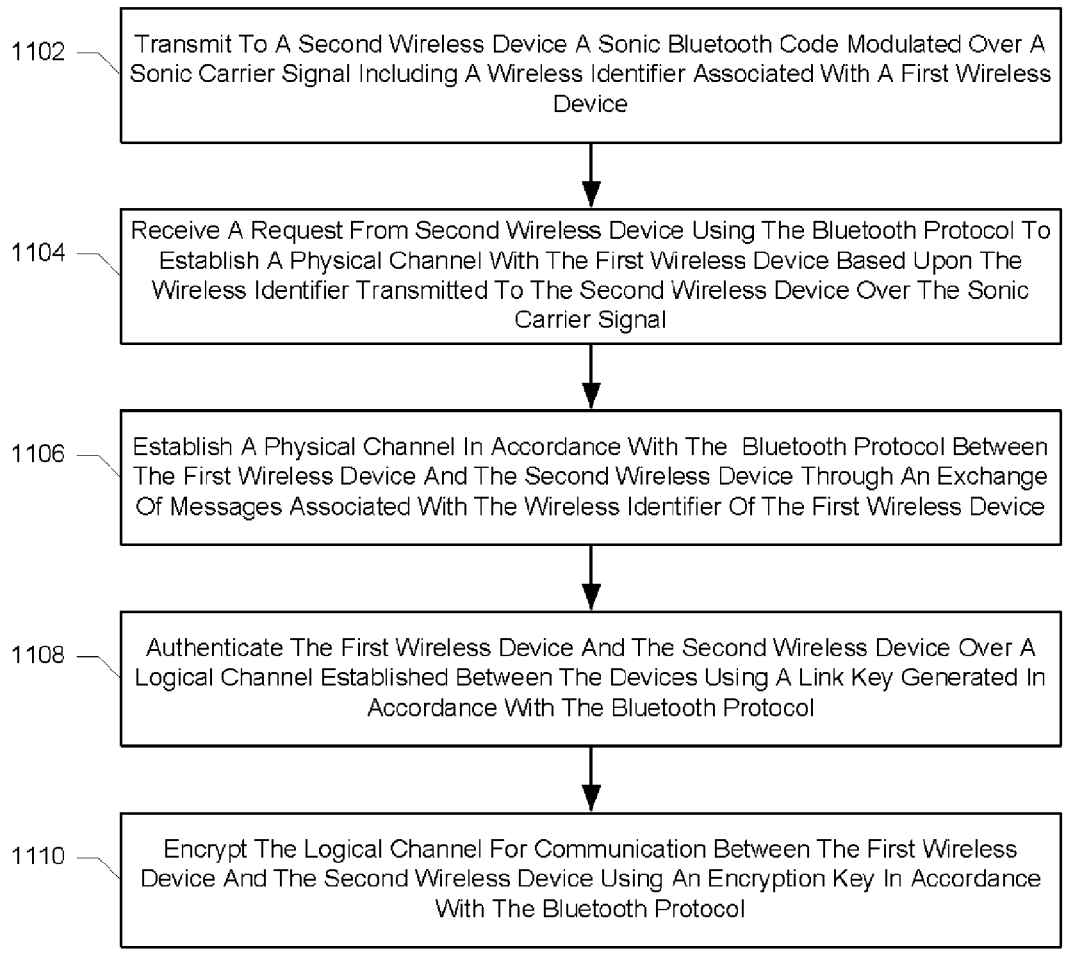
FIG. 11 is another flowchart diagram illustrating operations associated with sonically transmitting a wireless identifier and making a Bluetooth connection between a first wireless device and a second wireless device in accordance with one implementation.

FIG. 11 is another flowchart diagram illustrating operations associated with sonically transmitting a wireless identifier and making a Bluetooth connection between a first wireless device and a second wireless device in accordance with one implementation. For example, a Bluetooth headset can use these operations to sonically transmit the wireless identifier of the Bluetooth headset to a wireless phone device and then connect.

Accordingly, one implementation accesses a storage area associated with the first wireless device holding the sonic carrier signal and sonic Bluetooth code. The sonic carrier signal has a sonic Bluetooth code digitally modulated over the sonic carrier signal and representative of the wireless identifier and potentially other Bluetooth related parameters. As previously described, the sonic carrier signal may be stored as a file in a structured filesystem area in the storage area or may be stored as a stream of binary data in a more unstructured portion of the storage area. It is also contemplated that the storage area holding the sonic carrier signal may be part of the first wireless device or may be separate from the first wireless device. For example, a car kit and Bluetooth speakerphone built into a car may access a storage area separately located along with other electronics within the car.

Next, aspects of the present invention transmit the sonic Bluetooth code modulated over the sonic carrier signal including a wireless identifier associated with the first wireless device (1102). Generally, the wireless identifier is associated with a first wireless device, such as a Bluetooth headset, and is to be received by a second wireless device through a sonic transducer. The second wireless device could be a wireless phone device receiving the sonic carrier signal through a microphone or may be any other Bluetooth capable device. In addition to the wireless identifier, the sonic Bluetooth code may include additional data such as a link key, an authentication key and potentially other data associated with the Bluetooth protocol or useful to the operation of the Bluetooth devices.

If the transmission is successful, aspects of the present invention receive a request from the second wireless device to establish a physical channel with the first wireless device using the Bluetooth protocol (1104). In one implementation of the present invention, the first wireless device receives the request from the second wireless device using the Paging substate of the Bluetooth protocol. In this or other implementations, the Bluetooth connection occurs more quickly between the first and second wireless device by avoiding the time consuming Inquiry substate—sometimes referred to as Bluetooth discovery. For example, a Bluetooth headset or other Bluetooth-enabled wireless device receives the connection request in the Paging substate directly from the wireless phone device using the wireless identifier transmitted over the sonic carrier signal.

Next, the first wireless device and second wireless device establish a physical channel in accordance with the Bluetooth protocol through an exchange of messages associated with the wireless identifier (1106). Generally the physical channel is established as soon as the first wireless device accepts the request; this causes both devices to enter the next Bluetooth substate of Authentication. Authentication helps verify the identity of the wireless devices in preparation for exchanging data over a logical channel. Of course, it is also possible that the first wireless device may reject the request to establish the physical channel in which case the Authentication substate is not entered and the Bluetooth protocol terminates.

Accordingly, authentication identifies the first wireless device and the second wireless device over a logical channel using a link key generated in accordance with the Bluetooth protocol (1108). Bluetooth devices that already have a link key are deemed "bonded" and therefore can be authenticated immediately. However, if the devices are not bonded then Bluetooth authenticates them using a challenge-response protocol that incorporates an authentication key and wireless identifier. In one implementation, the second wireless device "challenges" the first wireless device to derive a link key from a random number and the wireless identifier of the first wireless device.

While the authentication key for the challenge may be provided by the user, aspects of the present invention may also incorporate the authentication key as part of the sonic Bluetooth code transmitted to the second wireless device over the sonic carrier signal. For more immediate bonding between the wireless devices, it is also contemplated that the link key may be provided directly as part of the sonic Bluetooth code and in accordance with further aspects of the present invention. Aspects of the present invention may also use another pairing protocol from Bluetooth standard referred to as Secure Simple Pairing (SSP) to perform the authentication and pairing.

Devices generally encrypt communication over the logical channel rather than share with all devices on the piconet (1110). The Bluetooth protocol creates an encryption key to encrypt the packets and then shares the encryption key with select devices. Only the selected devices on the piconet sharing the encryption key will be able to effectively communicate with each other.

Figure 12:
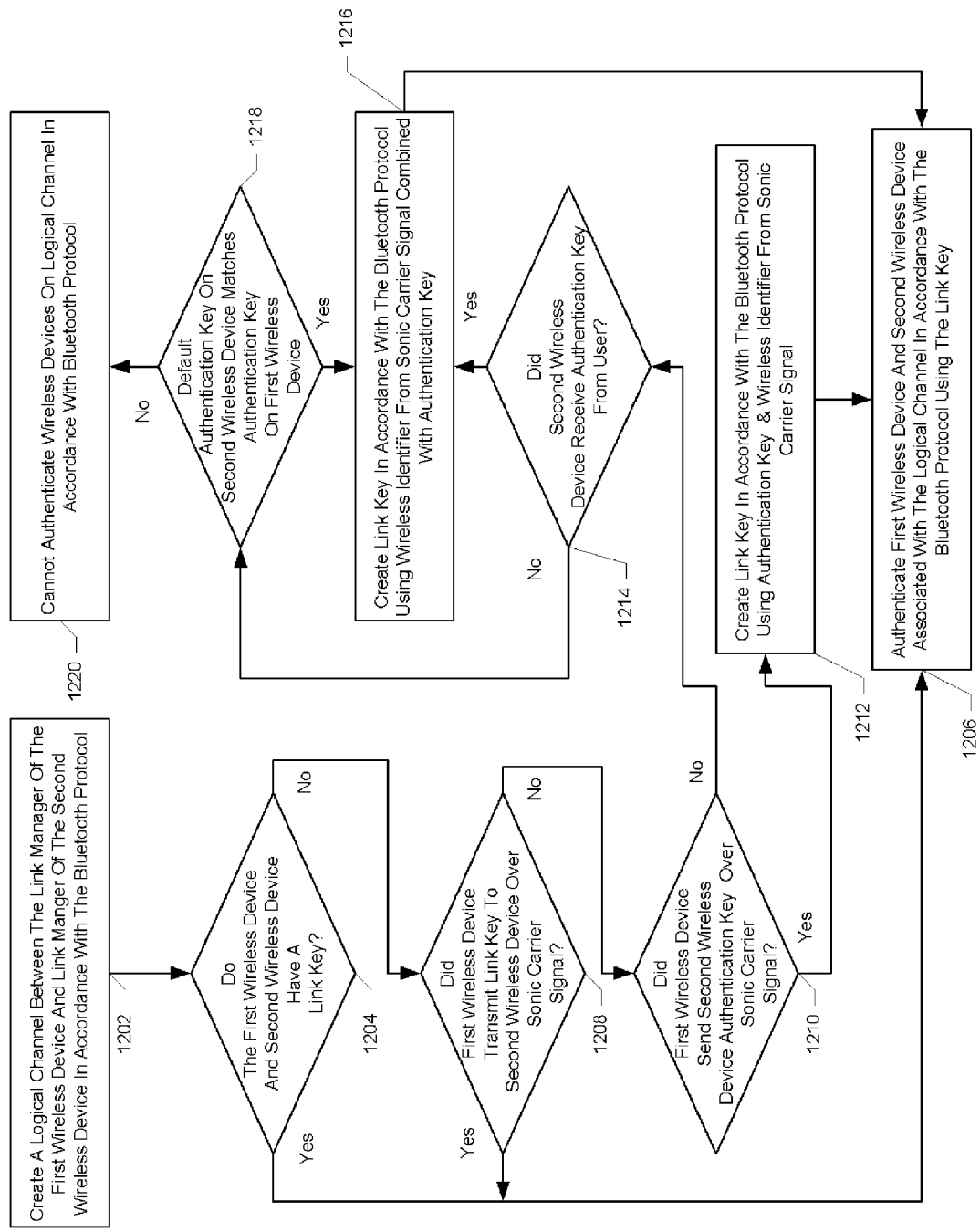
FIG. 12 is another flowchart diagram illustrating further authentication operations possible when providing a sonic Bluetooth code over a sonic carrier signal in accordance with one implementation of the present invention.

FIG. 12 is another flowchart diagram illustrating further authentication operations possible when providing a sonic Bluetooth code over a sonic carrier signal in accordance with the present invention. Aspects of the present invention initially create a logical channel between the link manager of the first wireless device and link manager of the second wireless device using a sonically transmitted wireless identifier (1202). Devices on the logical channel should be authenticated shortly after the logically channel is created. Fortunately, if the first and second device already have a link key (i.e., the devices are bonded) (1204-Yes) the devices have been authenticated in connection with the logical channel and can proceed to communicate over the logical channel in accordance with the Bluetooth protocol (1206).

Implementations of the present invention provide several different and novel approaches to authentication if the devices do not already have a link key (1204-No). First, one implementation of the present invention may include a link key in the sonic Bluetooth code transmitted from the first wireless device to the second wireless device (1208-Yes). For example, a Bluetooth headset device may send both the wireless identifier and link key over the sonic carrier signal to a wireless phone device. Once again, the first and second devices are authenticated, bonded and can continue communications using the Bluetooth protocol (1206).

If the link key is not provided (1208-No), an alternate implementation of the present invention may include the wireless identifier and authentication key in the sonic Bluetooth code transmitted from the first wireless device to the second wireless device (1210-Yes). Accordingly, aspects of the present invention create a link key in accordance with the Bluetooth protocol using the authentication key and wireless identifier from the sonic carrier signal (1212). These devices also continue with the Bluetooth protocol once they are properly authenticated (1206).

Aspects of the present invention may also assist in authentication even if the wireless identifier but not the authentication key is provided (1210-No). To authenticate the devices under these conditions, the second wireless device may receive the authentication key from a user (1214-Yes) and then combine with the wireless identifier transmitted over the sonic carrier signal (1216). The link key is created using this data enabling the wireless devices to be authenticated and continue with the Bluetooth protocol (1206). Authentication is still possible if the user does not provide the authentication key (1214-No) as long as the default authentication key on the second wireless device matches the authentication key on the first wireless device (1218-Yes). Aspects of the present invention would then combine the wireless identifier transmitted over the sonic carrier signal with the default authentication key (1216) thus facilitating authentication of the wireless devices once again. In the event the authentication key is improper or not provided, wireless devices on the logical channel may not be authenticated in accordance with the Bluetooth protocol (1220).

Figure 13:
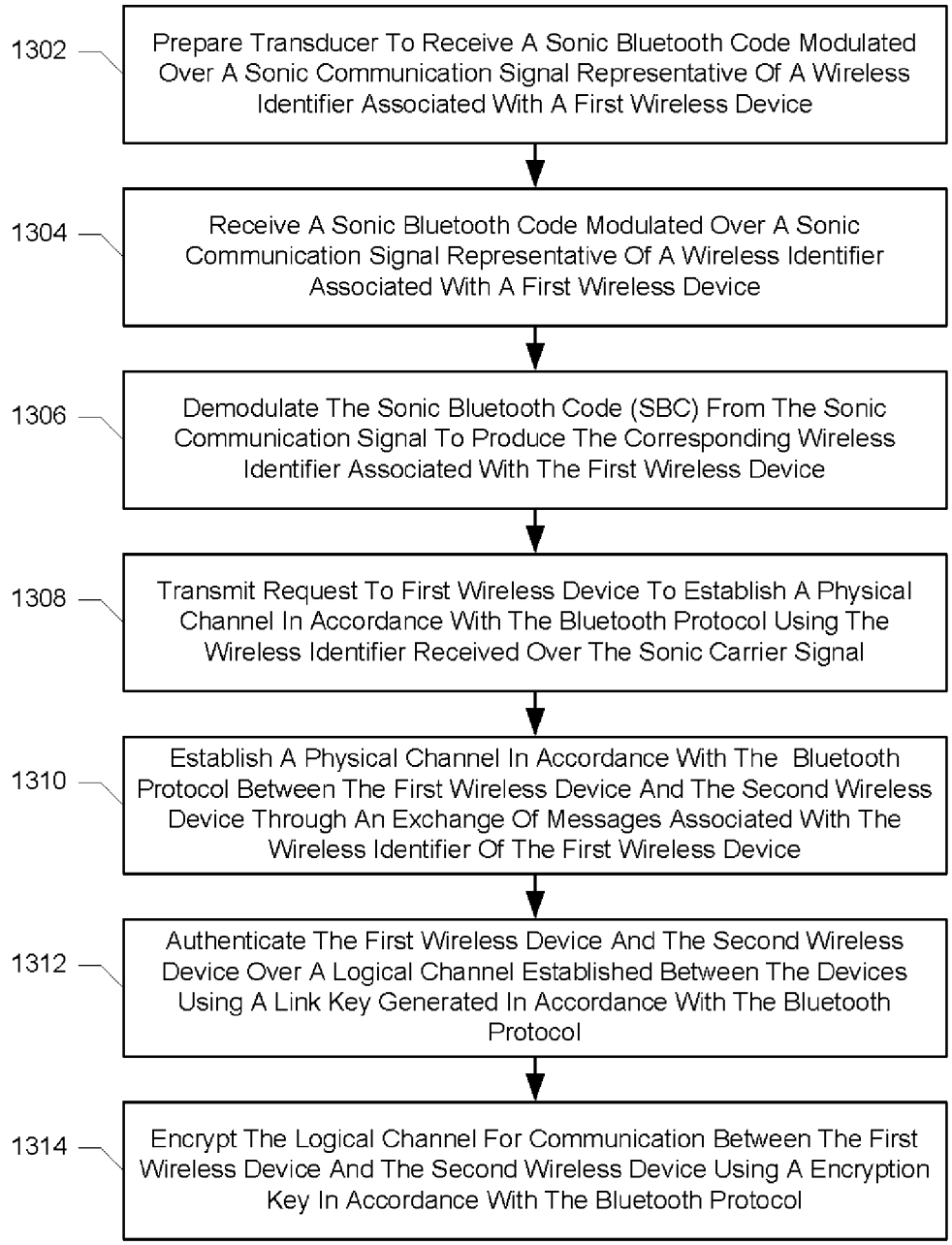
FIG. 13 is another flowchart diagram illustrating operations associated with sonically receiving a wireless identifier and making a Bluetooth connection between a second wireless device and a first wireless device in accordance with one implementation.

FIG. 13 is another flowchart diagram illustrating operations associated with sonically receiving a wireless identifier and making a Bluetooth connection between a second wireless device and a first wireless device. Aspects of the present invention initially prepare a transducer, such as a microphone, on a second wireless device to receive a sonic Bluetooth code modulated over a sonic carrier signal (1302). In one implementation, the microphone and CODEC continuously process audio and determine if the demodulated sonic carrier signal received has a sonic Bluetooth code. This "always-on" approach may not be desirable as it expends a great deal of energy on the second wireless device. This is particularly undesirable on a wireless phone device as it may drain the battery and render the phone inoperable for making phone calls or other functions.

Alternatively, the microphone and CODEC of the second wireless device may conditionally turn-on when in the presence of one or more Bluetooth devices. This conserves more energy on the second wireless device compared with the "always-on" approach. If the Bluetooth radio senses other Bluetooth devices, aspects of the present invention begins processing the audio and determines if the sonic carrier signal is carrying the sonic Bluetooth code. For example, a wireless phone device may begin processing audio when the signal strength detected from any nearby Bluetooth device reaches a minimum threshold. To reduce energy consumption further, a user may instead initiate audio processing by pressing a button or other control on the second wireless device to process the audio "on-demand". This last approach reduces the energy consumption as the audio processing occurs only when a sonic Bluetooth fast-sync connection in accordance with the present invention is desired. For example, the user may reprogram a physical button on the phone or a button on a touch screen of the phone to effectuate the on-demand implementation of Bluetooth fast-sync.

Each of the aforementioned approaches enables aspects of the present invention to receive the sonic Bluetooth code modulated over a sonic carrier signal (1304). The sonic carrier signal is generally transmitted from a speaker or other transducer associated with a first wireless device. For example, the speaker from a Bluetooth headset or Bluetooth carkit may be used to transmit the sonic carrier signal. One implementation receives and demodulates the sonic carrier signal on the second wireless device reproducing the sonic Bluetooth code and corresponding wireless identifier associated with the first wireless device (1306). In addition to the wireless identifier, sonic Bluetooth code may also include other useful data related to the Bluetooth protocol.

Implementations of the present invention may then transmit a request to first wireless device to establish a physical channel in accordance with the Bluetooth protocol (1308). Aspects of the present invention may use the Paging substate of the Bluetooth protocol directly without invoking the Inquiry substate. As previously described, this approach reduces the delay for connecting devices as the Inquiry substate or Bluetooth discovery process is time consuming and sometimes difficult. It is also advantageous as the sonic carrier signal can be more easily directed between a first and second wireless device attempting to become connected via the Bluetooth protocol.

Next, the first wireless device and second wireless device establish a physical channel in accordance with the Bluetooth protocol through an exchange of messages associated with the wireless identifier (1310). Generally the physical channel is established as soon as the first wireless device accepts the request; in addition this causes both devices to enter the next Bluetooth substate of Authentication. Alternatively, it is also possible that the first wireless device may reject the request to establish the physical channel in which case the Authentication substate is not entered and the Bluetooth protocol terminates.

Accordingly, authentication identifies the first wireless device and the second wireless device over a logical channel using a link key generated in accordance with the Bluetooth protocol (1312). Bluetooth devices that already have a link key are deemed "bonded" and therefore can be authenticated immediately. However, if the devices are not bonded then Bluetooth authenticates them using a challenge-response protocol incorporating an authentication key, a wireless identifier and potentially other information. Authentication may also be performed in accordance with the Secure Simple Pairing (SSP) of the Bluetooth protocol using at least a wireless identifier received over the sonic carrier signal. Indeed, aspects of the present invention may authenticate the first wireless device and second wireless device in substantially the same way as described in conjunction with FIG. 12.

Devices generally encrypt communication over the logical channel rather than share with all devices on the piconet (1314). The Bluetooth protocol uses an encryption key to encrypt the packets and then shares encryption key with certain devices.

While examples and implementations have been described, they should not serve to limit any aspect of the present invention. Accordingly, implementations of the invention can be implemented in digital electronic circuitry, or in computer hardware, firmware, software, or in combinations of them. Apparatus of the invention can be implemented in a computer program product tangibly embodied in a machine readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high level procedural or object oriented programming language, or in assembly or machine language if desired; and in any case, the language can be a compiled or interpreted language. Suitable processors include, by way of example, both general and special purpose microprocessors. Generally, a processor will receive instructions and data from a read only memory and/or a random access memory. Generally, a computer will include one or more mass storage devices for storing data files; such devices include magnetic disks, such as internal hard disks and removable disks; magneto optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto optical disks; and CD ROM disks. Any of the foregoing can be supplemented by, or incorporated in, ASICs.

While specific embodiments have been described herein for purposes of illustration, various modifications may be made without departing from the spirit and scope of the invention. Accordingly, the invention is not limited to the above-described implementations, but instead is defined by the appended claims in light of their full scope of equivalents.

What is claimed is:

1. A processor implemented method of providing a wireless identifier that identifies a first wireless device, comprising:
    associating a wireless identifier with a first wireless devices that identifies the first wireless device and facilitates establishing communication with a second wireless device in accordance with a challenge-response protocol;
    modulating at least the wireless identifier associated with the first wireless device as a sonic code over a sonic carrier signal to be transmitted as sound; and
    storing a representation of the sonic carrier signal in a storage area associated with the first wireless device configured to transmit the sonic carrier signal carrying the sonic code when the sonic carrier signal is processed as part of the challenge-response protocol.

2. The method of claim 1 wherein the wireless identifier is a media access control (MAC) address associated with the first wireless device.

3. The method of claim 1 wherein the first wireless device is selected from a set of wireless devices including: a computer, a wireless phone device, a television, a display device, a picture frame, an electronic billboard and a medical device.

4. The method of claim 1 wherein the first wireless device is selected from a set of wireless devices including: a monaural headset, a stereo headset, a mobile speakerphone that may be used in a car and a non-mobile speakerphone integrated into a car.

5. The method of claim 1 wherein modulating the data over the sonic carrier signal further comprises:
    encoding the data over one or more frequencies of the sonic carrier signal in accordance with a frequency-shift keying (FSK) protocol.

6. The method of claim 1 further comprising creating a wireless profile on a server configured to access one or more custom features associated with the first wireless device selected from a set of custom features including: ringtones, screen savers, credits associated with loyalty programs and coupons.

7. The method of claim 1 further comprising creating a wireless profile on a server that includes an authentication key associated with the first wireless device and is used to authenticate the first wireless device and a second wireless device in accordance with the challenge-response protocol.

8. The method of claim 1 wherein storing the representation of the sonic carrier signal, further comprises:
    identifying a storage area associated with the first wireless device capable of storing the sonic carrier signal; and
    writing the sonic carrier signal having the sonic code into the storage area for subsequent access during transmission of the sonic code.

9. The method of claim 1 wherein the sonic code may be encoded to also include additional data selected from a set including: an authentication key and a link key.

10. A computer program product for providing a wireless identifier that identifies a first wireless device, tangibly stored on a computer readable medium, comprising instructions operable to cause a programmable processor to:
    associate a wireless identifier with a first wireless devices that identifies the first wireless device and facilitates establishing communication with a second wireless device in accordance with a challenge-response protocol;
    modulate at least the wireless identifier associated with the first wireless device as a sonic code over a sonic carrier signal to be transmitted as sound; and
    store a representation of the sonic carrier signal in a storage area associated with the first wireless device configured to transmit the sonic carrier signal carrying the sonic code when the sonic carrier signal is processed as part of the challenge-response protocol.

* * * * *